(12) United States Patent
Chang et al.

(10) Patent No.: US 11,573,026 B2
(45) Date of Patent: Feb. 7, 2023

(54) AIR HANDLING UNIT CONTROL SYSTEM

(71) Applicant: Chicony Power Technology Co., Ltd., New Taipei (TW)

(72) Inventors: Tse-Wen Chang, New Taipei (TW); Cheng-Yi Ho, New Taipei (TW); Wen-Yen Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 388 days.

(21) Appl. No.: 16/836,463

(22) Filed: Mar. 31, 2020

(65) Prior Publication Data

US 2020/0318847 A1 Oct. 8, 2020

Related U.S. Application Data

(60) Provisional application No. 62/828,505, filed on Apr. 3, 2019.

(30) Foreign Application Priority Data

Mar. 17, 2020 (TW) ................................. 109108849

(51) Int. Cl.
*F24F 11/65* (2018.01)
*G06F 3/04842* (2022.01)
*F24F 11/50* (2018.01)

(52) U.S. Cl.
CPC ............... *F24F 11/65* (2018.01); *F24F 11/50* (2018.01); *G06F 3/04842* (2013.01)

(58) Field of Classification Search
CPC .................................. F24F 11/65; F24F 11/50
(Continued)

(56) References Cited

U.S. PATENT DOCUMENTS 10,222,081 B2 3/2019 Iwasaki
11,098,911 B2 * 8/2021 Mosamkar ............. B01D 53/96
(Continued)

FOREIGN PATENT DOCUMENTS

CN 1664524 A 9/2005
CN 101988867 A 3/2011
(Continued)

OTHER PUBLICATIONS

Atlas of Modern Intelligent Building Systems Design, Construction Technology and Engineering., Lu Gongcheng, p. 504-508, China Architecture Publishing House, May 31, 2005.
(Continued)

*Primary Examiner* — Md Azad
(74) *Attorney, Agent, or Firm* — Innovation Capital Law Group, LLP; Vic Lin

(57) ABSTRACT

An air handling unit control system is applied to an air handling unit having a plurality of hardware devices. The air handling unit control system includes at least one expansion module and a main controller. The at least one expansion module is configured to be electrically connected to at least one expanded hardware device. The main controller is electrically connected to the expansion module to control the expanded hardware device. The main controller provides a setting interface according to the hardware devices and the expanded hardware device. The setting interface includes a plurality of setting items. When at least one of the setting items is triggered, the main controller executes a corresponding setting procedure according to the triggered setting item to set up the hardware devices and the expanded hardware device.

15 Claims, 29 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 2010/0179696 | A1* | 7/2010 | Grohman | G05B 15/02 |
| | | | | 715/764 |
| 2010/0241287 | A1 | 9/2010 | Nishino et al. | |
| 2012/0078424 | A1 | 3/2012 | Raghavachari | |
| 2012/0221150 | A1* | 8/2012 | Arensmeier | G05B 23/0224 |
| | | | | 702/183 |
| 2012/0245968 | A1 | 9/2012 | Beaulieu et al. | |
| 2015/0134123 | A1 | 5/2015 | Obinelo | |
| 2015/0323208 | A1* | 11/2015 | Son | F24F 11/70 |
| | | | | 165/250 |
| 2016/0025578 | A1 | 1/2016 | Meirav et al. | |
| 2017/0212487 | A1* | 7/2017 | Gupta | H04L 12/2807 |
| 2019/0041882 | A1* | 2/2019 | Noboa | F24F 11/30 |
| 2019/0316798 | A1 | 10/2019 | Kokugan et al. | |
| 2020/0386433 | A1* | 12/2020 | Honda | F24F 11/46 |

FOREIGN PATENT DOCUMENTS

| | | |
|---|---|---|
| CN | 102147146 A | 8/2011 |
| CN | 102521498 A | 6/2012 |
| CN | 102759237 A | 10/2012 |
| CN | 102865643 A | 1/2013 |
| CN | 103019135 A | 4/2013 |
| CN | 103776129 A | 5/2014 |
| CN | 104456852 A | 3/2015 |
| CN | 104990222 A | 10/2015 |
| CN | 105091097 A | 11/2015 |
| CN | 207438828 U | 6/2018 |
| CN | 108253514 A | 7/2018 |
| CN | 109099552 A | 12/2018 |
| CN | 110195950 A | 9/2019 |
| TW | 200951380 A | 12/2009 |
| TW | 201215823 A | 4/2012 |
| TW | 201248095 A | 12/2012 |
| TW | M487577 U | 10/2014 |
| TW | I521385 B | 2/2016 |
| TW | M526148 U | 7/2016 |
| TW | M535792 U | 1/2017 |

OTHER PUBLICATIONS

Lee et al., The new generation of industrial intelligence, Apr. 30, 2017, Shanghai Jiao Tong University Press pp. 129-133, tables 5-4, 5-5.

* cited by examiner

FIG. 3

| Setting procedure of intelligent air handling unit controller | | |
|---|---|---|
| 541 — Maintenance setting | Wired network | |
| 542 — Connection setting | IP address: | 192 . 168 . 1 . 88 |
| 543 — Inverter setting | Network mask: | 255 . 255 . 255 . 0 |
| 544 — Module setting | Interface port: | 9001 |
| 545 — Scheduling setting | Wireless network | |
| 546 — Early-warning function setting | Network name: | AHUControllerWifi |
| 547 — Date and time setting | Network password: | 00000000 |
| Advanced setting | Module search | |
| 548 — Third-party interface | | |
| Wireless sensor setting | | |

| Module ID | Module type |
|---|---|
| 2 | Module_Board_A**3 |
| 2 | Module_Board_A**3 |

Search

Save

FIG. 4

| Setting procedure of intelligent air handling unit controller | Module | | | | admin ▼ |
|---|---|---|---|---|---|
| 541 — Maintenance setting | Module template | | | | |
| 542 — Connection setting | | | 15_A_1x2 | Re-select | |
| 543 — Inverter setting | Module name | Module type | Module attribute | | |
| 544 — Module setting | Air supply blower group | Air supply blower group | Air differential pressure sensor Temperature & Humidity sensor | Edit | Clear |
| 545 — Scheduling setting | Coil 1 | Coil number 1 | | Edit | |
| 546 — Early-warning function setting | Filter 1 | Filter number 1 | | Edit | |
| | Filter 2 | Filter number 2 | | Edit | |
| | External air damper 1 | External air damper number 1 | | | |
| 547 — Date and time setting | Return air damper 1 | Return air damper number 1 | | Edit | |
| | Humidifier 1 | Humidifier number 1 | Custom name | Edit | Clear |
| 548 — Advanced setting | Heater 1 | Heater number 1 | | Edit | |
| — Third-party interface | | | | | |
| Wireless sensor setting | Wireless sensor | | | | |
| | ○ Turn on  ● Turn off | | | | |

FIG. 9

| Setting procedure of intelligent air handling unit controller | |
|---|---|
| 541 | Maintenance setting |
| 542 | Connection setting |
| 543 | Inverter setting |
| 544 | Module setting |
| 545 | Scheduling setting |
| 546 | Early-warning function setting |
| 547 | Date and time setting |
| | Advanced setting |
| 548 | Third-party interface |
| | Wireless sensor setting |

Create

| Number | Scheduling name |
|---|---|

Perpetual calendar

| Expired | | | | | | |
|---|---|---|---|---|---|---|
| | | | < 2020/01 > | | | |
| Monday | Tuesday | Wednesday | Thursday | Friday | Saturday | Sunday |
| | | 01 Not specify scheduling | 02 Not specify scheduling | 03 Not specify scheduling | 04 Not specify scheduling | 05 Not specify scheduling |
| 06 Not specify scheduling | 07 Not specify scheduling | 08 Not specify scheduling | 09 Not specify scheduling | 10 Not specify scheduling | 11 Not specify scheduling | 12 Not specify scheduling |
| 13 Not specify scheduling | 14 Not specify scheduling | 15 Not specify scheduling | 16 Not specify scheduling | 17 Not specify scheduling | 18 Not specify scheduling | 19 Not specify scheduling |
| 20 Not specify scheduling | 21 Not specify scheduling | 22 Not specify scheduling | 23 Not specify scheduling | 24 Not specify scheduling | 25 Not specify scheduling | 26 Not specify scheduling |
| 27 Not specify scheduling | 28 Not specify scheduling | 29 Not specify scheduling | 30 Not specify scheduling | 31 Not specify scheduling | | |

| Setting procedure of intelligent air handling unit controller |
|---|
| Maintenance setting |
| Connection setting |
| Inverter setting |
| Module setting |
| Scheduling setting |
| Early-warning function setting |
| Date and time setting |
| Advanced setting |
| Third-party interface |
| Wireless sensor setting |

541 — Maintenance setting
542 — Connection setting
543 — Inverter setting
544 — Module setting
545 — Scheduling setting
546 — Early-warning function setting
547 — Date and time setting
548 — Third-party interface & admin ▼

Create

| Number | Scheduling name | | | | | | Edit | Test | Delete |
|---|---|---|---|---|---|---|---|---|---|
| 1 | Test | | | | | | | | |

Perpetual calendar

| Expired | | | < 2020/01 > | | | |
|---|---|---|---|---|---|---|
| Monday | Tuesday | Wednesday | Thursday | Friday | Saturday | Sunday |
| | | 01 Not specify scheduling | 02 Not specify scheduling | 03 Not specify scheduling | 04 Not specify scheduling | 05 Not specify scheduling |
| 06 Not specify scheduling | 07 Not specify scheduling | 08 Not specify scheduling | 09 Not specify scheduling | 10 Not specify scheduling | 11 Not specify scheduling | 12 Not specify scheduling |
| 13 Not specify scheduling | 14 Not specify scheduling | 15 Not specify scheduling | 16 Not specify scheduling | 17 Not specify scheduling | 18 Not specify scheduling | 19 Not specify scheduling |
| 20 Not specify scheduling | 21 Not specify scheduling | 22 Test | 23 Test | 24 Test | 25 Not specify scheduling | 26 Not specify scheduling |
| 27 Test | 28 Test | 29 Test | 30 Test | 31 Test | | |

FIG. 17

| Setting procedure of intelligent air handling unit controller | | Group | Inverter early-warning temperature | Inverter stop temperature | Motor early-warning temperature | Motor stop temperature |
|---|---|---|---|---|---|---|
| 681 | Maintenance setting — Inverter | Air supply blower group | 50 | 100 | 50 | 100 |
| 682 | — Filter | | | | | |
| 683 | Connection setting — Coil decay rate | | | | | |
| 684 | — Coil model | | | | | |
| 685 | Invertor setting — Sensor | | | | | |
| 686 | Motor setting — Inverter and motor temperature | | | | | |
| | Scheduling setting | | | | | |
| 546 | Early-warning function setting | | | | | |
| | Date and time setting | | | | | |
| | Advanced setting | | | | | |
| | Third-party interface | | | | | |
| | Wireless sensor setting | | | | | |

FIG. 19

| Setting procedure of intelligent air handling unit controller | Inverter | | Filter name | Initial pressure difference of a filter(Pa) | Filter pressure difference early-warning(Pa) | Current filter pressure difference(Pa) | Current filter service time (hour) | |
|---|---|---|---|---|---|---|---|---|
| Maintenance setting | Filter | | Intermediate filter | 100 | 250 | 0 | 1.49 | Reset |
| Connection setting | Coil decay rate | | Preliminary filter | 50 | 150 | 0 | 1.48 | Reset |
| Invertor setting | Coil model | | | | | | | |
| Module setting | Sensor | | | | | | | |
| Scheduling setting | Inverter and motor temperature | | | | | | | |
| Early-warning function setting | | | | | | | | |
| Date and time setting | | | | | | | | |
| Advanced setting | | | | | | | | |
| Third-party interface | | | | | | | | |
| Wireless sensor setting | | | | | | | | |

FIG. 24

| Setting procedure of intelligent air handling unit controller | | Download | | | | |
|---|---|---|---|---|---|---|
| | | AIO/DIO | Equipment | Attribute | Instruction function | Modbus instruction |
| 541 | Maintenance setting | 0x0001 | Coil 1 | Coil water flow | Read | 0x00 0x00 0x00 0x00 0x00 0x00 0x00 0x06<br>0x01 0x04 0x00 0x01 0x00 0x01 0x00 0x02 |
| 542 | Connection setting | 0x0003 | Coil 1 | Cooling capacity of coil | Read | 0x00 0x00 0x00 0x00 0x00 0x00 0x00 0x06<br>0x01 0x04 0x00 0x03 0x00 0x01 0x00 0x02 |
| 543 | Inverter setting | 0x0005 | Coil 1 | Dynamic margin value of coil | Read | 0x00 0x00 0x00 0x00 0x00 0x00 0x00 0x06<br>0x01 0x04 0x00 0x05 0x00 0x01 0x00 0x02 |
| 544 | Module setting | 0x0007 | Filter 1 | Accumulated service time of filter | Read | 0x00 0x00 0x00 0x00 0x00 0x00 0x00 0x06<br>0x01 0x04 0x00 0x07 0x00 0x01 0x00 0x02 |
| 545 | Scheduling setting | 0x0009 | Filter 1 | Estimated service time of filter | Read | 0x00 0x00 0x00 0x00 0x00 0x00 0x00 0x06<br>0x01 0x04 0x00 0x09 0x00 0x01 0x00 0x02 |
| 546 | Early-warning function setting | 0x000B | Filter 1 | Reset the service time of filter | Control | 0x00 0x00 0x00 0x00 0x00 0x00 0x00 0x06<br>0x01 0x04 0x00 0x0B 0x00 0x01 0x00 0x02 |
| 547 | Date and time setting | 0x000D | Filter 2 | Accumulated service time of filter | Read | 0x00 0x00 0x00 0x00 0x00 0x00 0x00 0x06<br>0x01 0x04 0x00 0x0D 0x00 0x01 0x00 0x02 |
| | Advanced setting | 0x000F | Filter 2 | Estimated service time of filter | Read | 0x00 0x00 0x00 0x00 0x00 0x00 0x00 0x06<br>0x01 0x04 0x00 0x0F 0x00 0x01 0x00 0x02 |
| 548 | Third-party interface | 0x0011 | Filter 2 | Reset the service time of filter | Control | 0x00 0x00 0x00 0x00 0x00 0x00 0x00 0x06<br>0x01 0x04 0x00 0x11 0x00 0x01 0x00 0x02 |
| | Wireless sensor setting | 0x0013 | Return air damper 1 | Custom name: Custom name | Read | 0x00 0x00 0x00 0x00 0x00 0x00 0x00 0x06<br>0x01 0x04 0x00 0x13 0x00 0x01 0x00 0x02 |

FIG. 26

AIR HANDLING UNIT CONTROL SYSTEM

CROSS-REFERENCES TO RELATED APPLICATIONS

This application claims the priority benefit of U.S. provisional application Ser. No. 62/828,505, filed on Apr. 3, 2019 and Patent Application No. 109108849 filed in Taiwan, R.O.C. on Mar. 17, 2020. The entirety of the above-mentioned patent applications are hereby incorporated by references herein and made a part of the specification.

BACKGROUND

Technical Field

The present disclosure relates to an air handling unit, and in particular, to an air handling unit control system.

Related Art

An air handling unit is a terminal device commonly used in a central air-conditioning system, and has a main function of circulating air in a terminal space to a heat exchanger for heat exchange by transferring it to a fluid in a pipeline. A control manner of the existing air handling unit is mainly performing control integration with a universal digital logic controller (DDC) or programmable logic controller (PLC) to set feedback logic control for controllable elements of the air handling unit respectively, so as to achieve an objective of environment control.

However, these types of control systems cannot integrate performance curve parameters of heat exchangers, blowers, and other elements, and therefore cannot achieve equipment efficiency prediction alarm and complete air thermal property change functions, and the control systems neither can efficiently provide comprehensive setting and analysis of the entire system nor can actively grasp operational efficiency changes of the elements in the air handling unit.

SUMMARY

The present disclosure provides an air handling unit control system, applied to an air handling unit having a plurality of hardware devices. The air handling unit control system includes at least one expansion module and a main controller. The expansion module is configured to be electrically connected to at least one expanded hardware device. The main controller is electrically connected to the expansion module to control the expanded hardware device. The main controller provides a setting interface according to the hardware devices and the expanded hardware device. The setting interface includes a plurality of setting items. When at least one of the setting items is triggered, the main controller executes a corresponding setting procedure according to the triggered setting item to set up the hardware devices and the expanded hardware device.

In some embodiments, the hardware devices or the expanded hardware device include/includes a blower, a coil, a filter, a damper, a water control valve, a heater, or a humidifier, and the blower comprises an inverter and a motor.

In some embodiments, the main controller is further signally connected to a plurality of sensors, configured to sense an equipment parameter and an ambient parameter during operation of the hardware devices and the expanded hardware device, respectively, and return the equipment parameter and the ambient parameter to the main controller.

In some embodiments, the setting items include a maintenance setting, a connection setting, an inverter setting, a module setting, a scheduling setting, an early-warning function setting, and a date and time setting.

In some embodiments, the expansion module is electrically connected to the main controller through a connection line.

In some embodiments, the main controller is further electrically connected to a screen, configured to display the setting interface.

In some embodiments, after the main controller completes the settings of the hardware devices and the at least one expanded hardware device, the main controller further provides a display interface to present a plurality of graphical elements corresponding to the hardware devices and the expanded hardware device on the display interface, and when one of the graphical elements is clicked, the equipment parameter and the ambient parameter corresponding to the clicked graphical element are simultaneously displayed on the display interface.

In some embodiments, after the main controller completes the settings of the hardware devices and the expanded hardware device, the main controller further provides a display interface to present graphical integrated information corresponding to the hardware devices and the expanded hardware device on the display interface during operation.

Therefore, according to the present disclosure, on the premise of expandable hardware devices, a complete setting interface is provided for the hardware devices to set setting items to simplify a system setting process and effectively improve a coverage rate. Moreover, according to the present disclosure, analysis data can be effectively provided and a function of equipment efficiency decay prediction alarm can be achieved, to ensure that operational efficiency and states of the hardware devices during the operation of the air handling unit can be actively detected, and visual results are provided, to achieve an objective of intelligent control.

BRIEF DESCRIPTION OF THE DRAWINGS

FIG. 3 is a schematic diagram of display of a setting page for a maintenance setting on a setting interface according to an embodiment of the present disclosure;

FIG. 4 is a schematic diagram of display of a setting page for a connection setting on a setting interface according to an embodiment of the present disclosure;

FIG. 9 is a schematic diagram of display of a setting page for a module setting on a setting interface according to an embodiment of the present disclosure;

FIG. 13 is a schematic diagram of display of a setting page for a scheduling setting on a setting interface according to an embodiment of the present disclosure;

FIG. 15 is a schematic diagram of display of an event create window in a scheduling setting according to an embodiment of the present disclosure;

FIG. 16 is a schematic diagram of display of a perpetual calendar setting window in a scheduling setting according to an embodiment of the present disclosure;

FIG. 17 is a schematic diagram of display of a setting page for completion of a scheduling setting on a setting interface according to an embodiment of the present disclosure;

FIG. 19 is a schematic diagram of display of a setting page for an inverter and motor temperature of an early-warning function setting on a setting interface according to an embodiment of the present disclosure;

FIG. 24 is a schematic diagram of display of a setting page for a filter of an early-warning function setting on a setting interface according to an embodiment of the present disclosure;

FIG. 26 is a schematic diagram of display of a setting page for a third-party interface on a setting interface according to an embodiment of the present disclosure;

DETAILED DESCRIPTION

Figure 1:
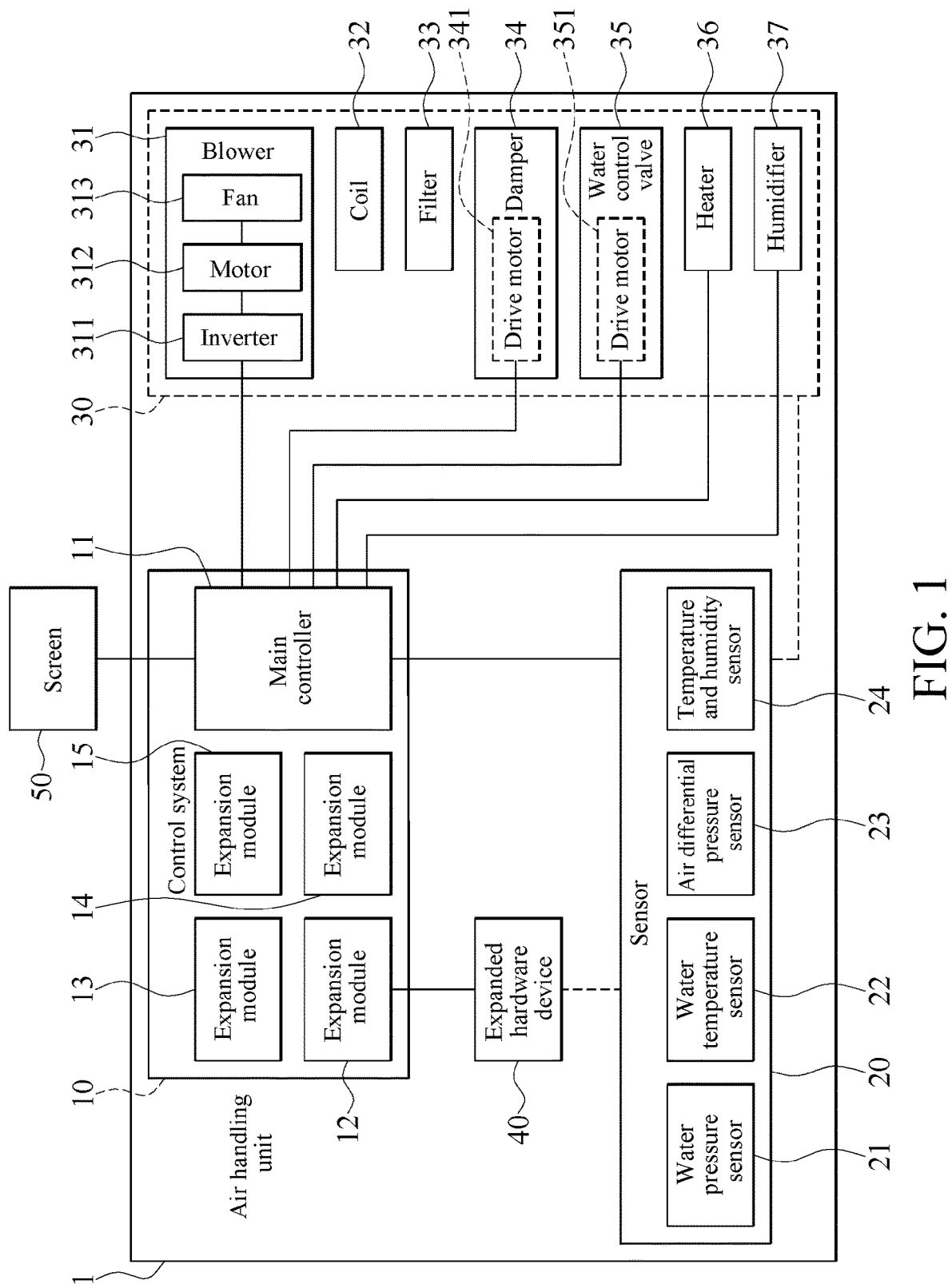
FIG. 1 is a schematic block diagram of an air handling unit according to an embodiment of the present disclosure.
Figure 2:
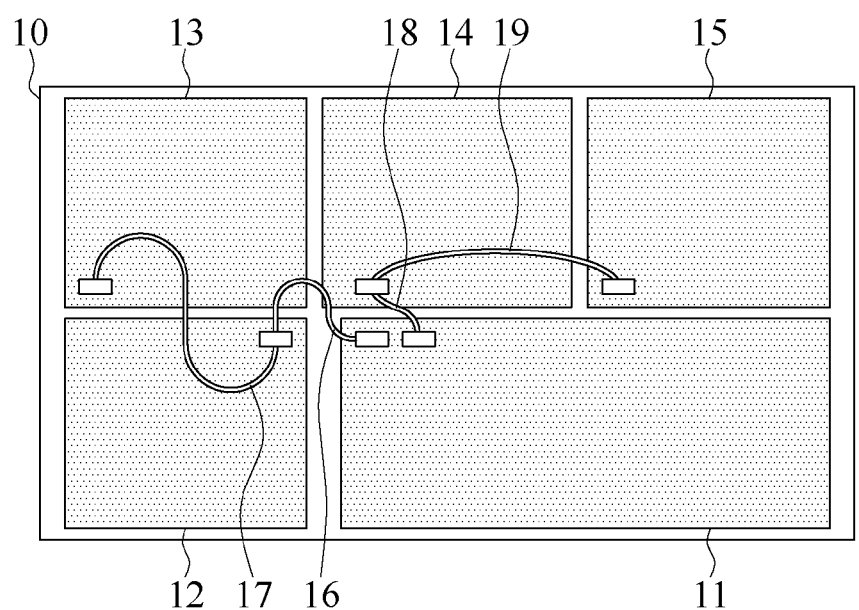
FIG. 2 is a schematic diagram of connection configuration of an air handling unit control system according to an embodiment of the present disclosure.

The present disclosure relates to an air handling unit control system, applied to an air handling unit having a plurality of hardware devices. Referring to FIG. 1, the air handling unit 1 includes a control system 10, a plurality of hardware devices 30, and a plurality of sensors 20. The control system 10 is signally connected to some of the hardware devices 30 and the sensors 20. The control system 10 includes a main controller 11 and at least one expansion module. The expansion module is electrically connected to at least one expanded hardware device. In this embodiment, by using four expansion modules 12, 13, 14, and 15 as an example, where the expansion module 12 is electrically connected to an expanded hardware device 40, referring to FIG. 1 and FIG. 2 together, the expansion modules 12-15 are electrically connected to the main controller 11 for serial connection and data transmission, and the main controller 11 directly controls the hardware devices 30 and controls the expanded hardware device 40 by the expansion module 12. In an embodiment, the expansion module 12 is electrically connected to the main controller 11 through a connection line 16; the expansion module 13 is electrically connected to the expansion module 12 through a connection line 17, and then electrically connected to the main controller 11 by the expansion module 12; the expansion module 14 is electrically connected to the main controller 11 through a connection line 18; and the expansion module 15 is electrically connected to the expansion module 14 through a connection line 19, and then electrically connected to the main controller 11 by the expansion module 14, where the connection lines 16-19 can be designed to have different connection forms according to actual states, as long as all the expansion modules 12-15 can be electrically connected to the main controller 11. Therefore, the main controller 11 can flexibly expand AIO/DIO modules (analog input/output and/or digital input/output modules) according to configuration requirements of the air handling unit 1, and the connection lines 16-19 between the main controller 11 and the expansion modules 12-15 can be RS485 wires, but are not limited thereto.

In an embodiment, the hardware devices 30 include a blower 31, a coil 32, a filter 33, a damper 34, a water control valve 35, a heater 36, or a humidifier 37, but are not limited thereto. The main controller 11 is electrically connected to the blower 31, a drive motor 341 of the damper 34, a drive motor 351 of the water control valve 35, the heater 36, and the humidifier 37 respectively to control operation of the elements respectively, and the blower 31 includes an inverter 311, a motor 312, and at least one fan 313. The motor 312 is electrically connected to the inverter 311 and the fan 313 to control the inverter 311 by the main controller 11. The inverter 311 controls a rotation speed of the motor 312 to cause the motor 312 to drive the fan 313 to rotate. The expanded hardware device 40 can be arbitrarily selected from the blower, the coil, the filter, the damper, the water control valve, the heater, or the humidifier, etc., and is not limited to any hardware device herein. In an embodiment, the sensors 20 include a water pressure sensor 21, a water temperature sensor 22, an air differential pressure sensor 23, and a temperature and humidity sensor 24. The sensors 20 are electrically connected to the main controller 11, and are configured to sense an equipment parameter and an ambient parameter during operation of the hardware devices 30 and the expanded hardware device 40, respectively, and return the equipment parameter and the ambient parameter to the main controller 11.

Figure 3:
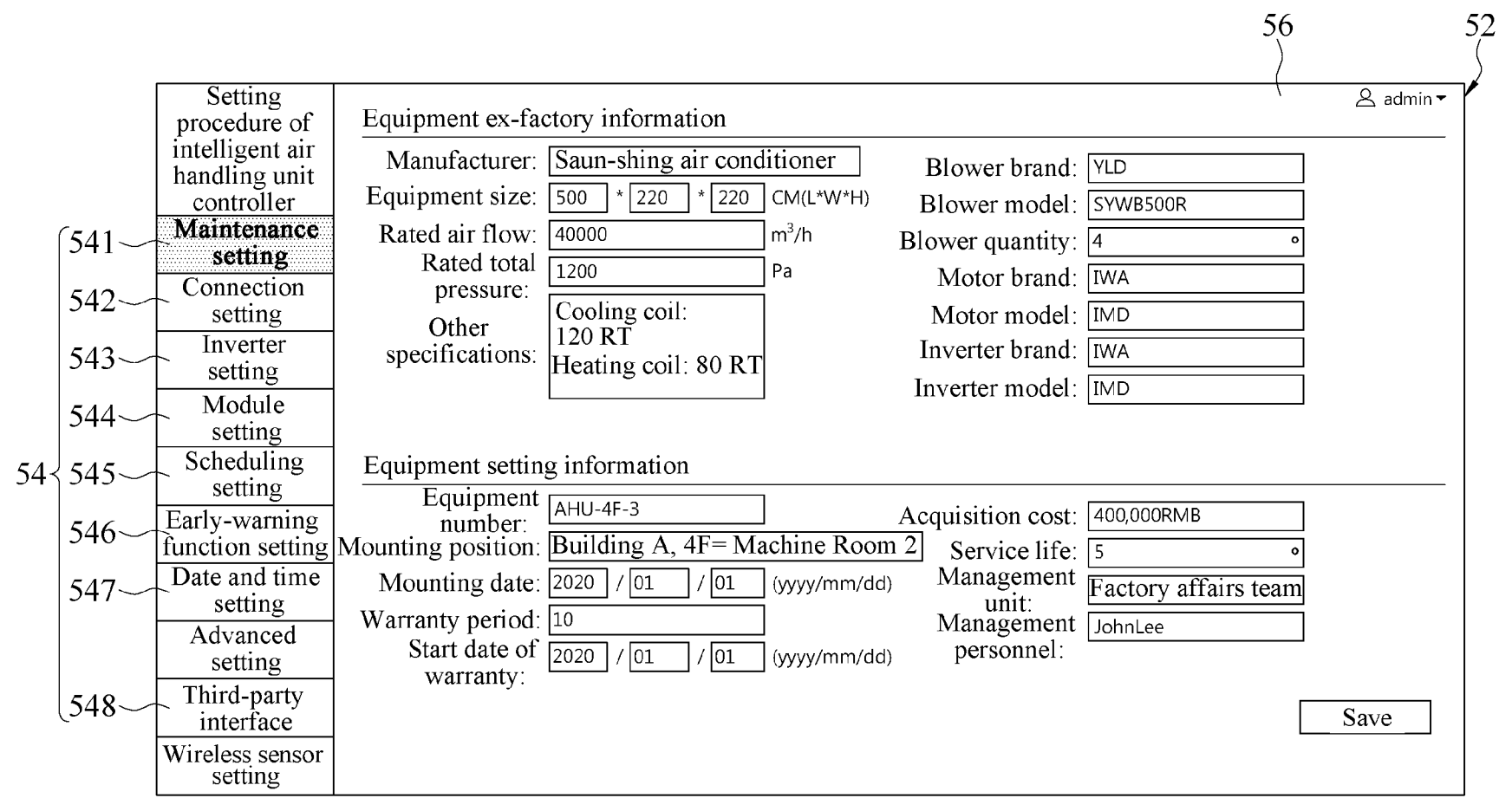

Referring to FIG. 1 and FIG. 3 together, the main controller 11 is further electrically connected to a screen 50. The main controller 11 provides a setting interface 52 correspondingly according to the hardware devices 30 and the expanded hardware device 40, and displays the setting interface 52 on the screen 50. The setting interface 52 includes a plurality of setting items 54. When at least one of the setting items 54 is triggered, the main controller 11 executes a corresponding setting procedure according to the triggered setting item 54 to set up the hardware devices 30 and the expanded hardware device 40. In an embodiment, the setting items 54 include a maintenance setting 541, a connection setting 542, an inverter setting 543, a module setting 544, a scheduling setting 545, an early-warning function setting 546, a date and time setting 547, and a third-party interface 548.

Referring to FIG. 1 and FIG. 3 together, for the maintenance setting 541 in the setting items 54, when the maintenance setting 541 in the setting items 54 on the setting interface 52 is clicked, the maintenance setting 541 is triggered to display a corresponding setting page 56 to execute a corresponding setting procedure to set maintenance information, thereby inputting equipment ex-factory information, equipment setting information, and the like of the air handling unit 1.

Referring to FIG. 1 and FIG. 4 together, for the connection setting 542 in the setting items 54, when the connection setting 542 in the setting items 54 on the setting interface 52 is clicked, the connection setting 542 is triggered to display a corresponding setting page 58 to execute a corresponding setting procedure to set a network address, thereby setting an IP address, a network mask, and an interface port of a wired network, or setting a network name and a network password of a wireless network.

Figure 5:
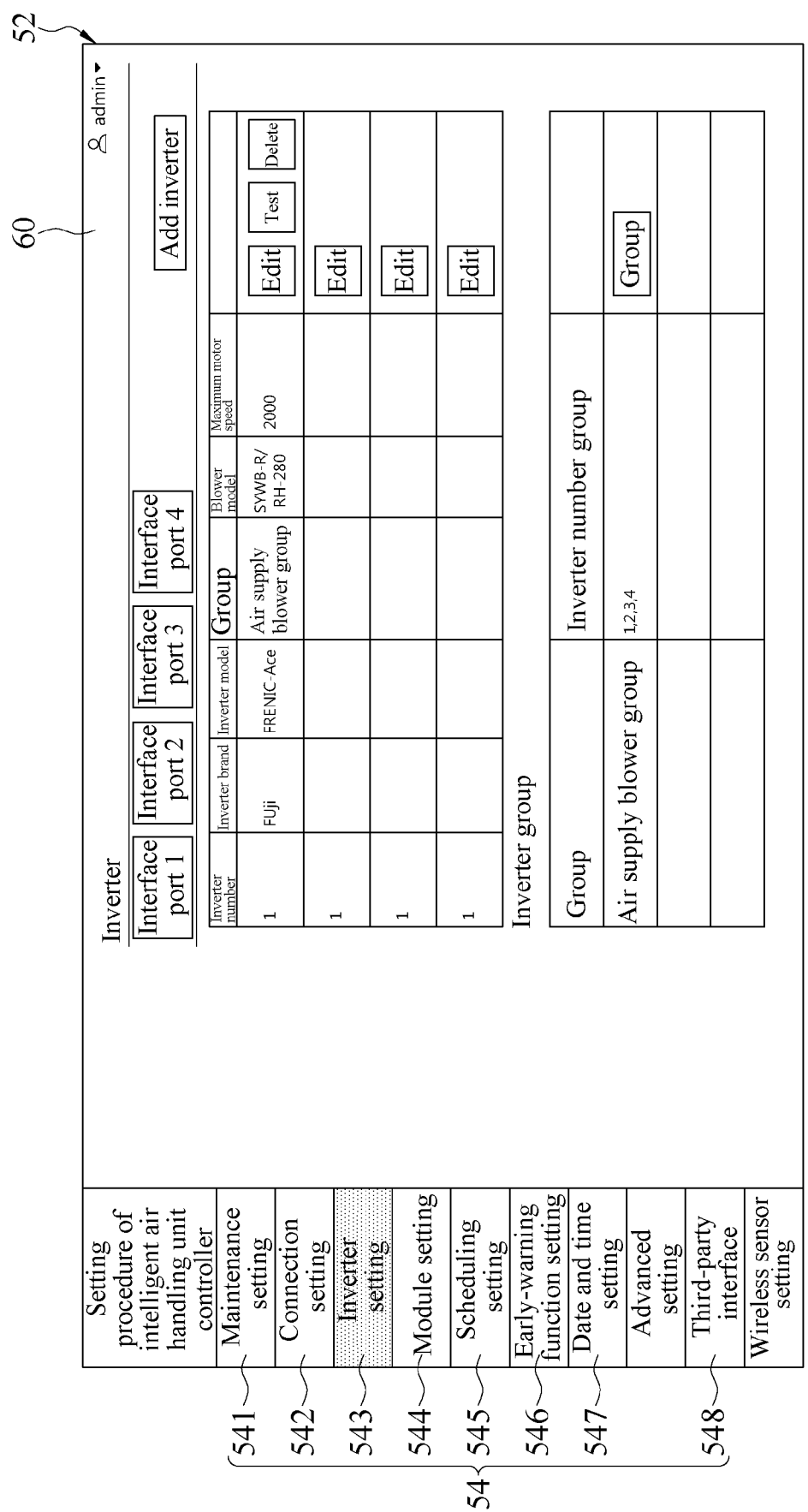
FIG. 5 is a schematic diagram of display of a setting page for an inverter setting on a setting interface according to an embodiment of the present disclosure.
Figure 6:
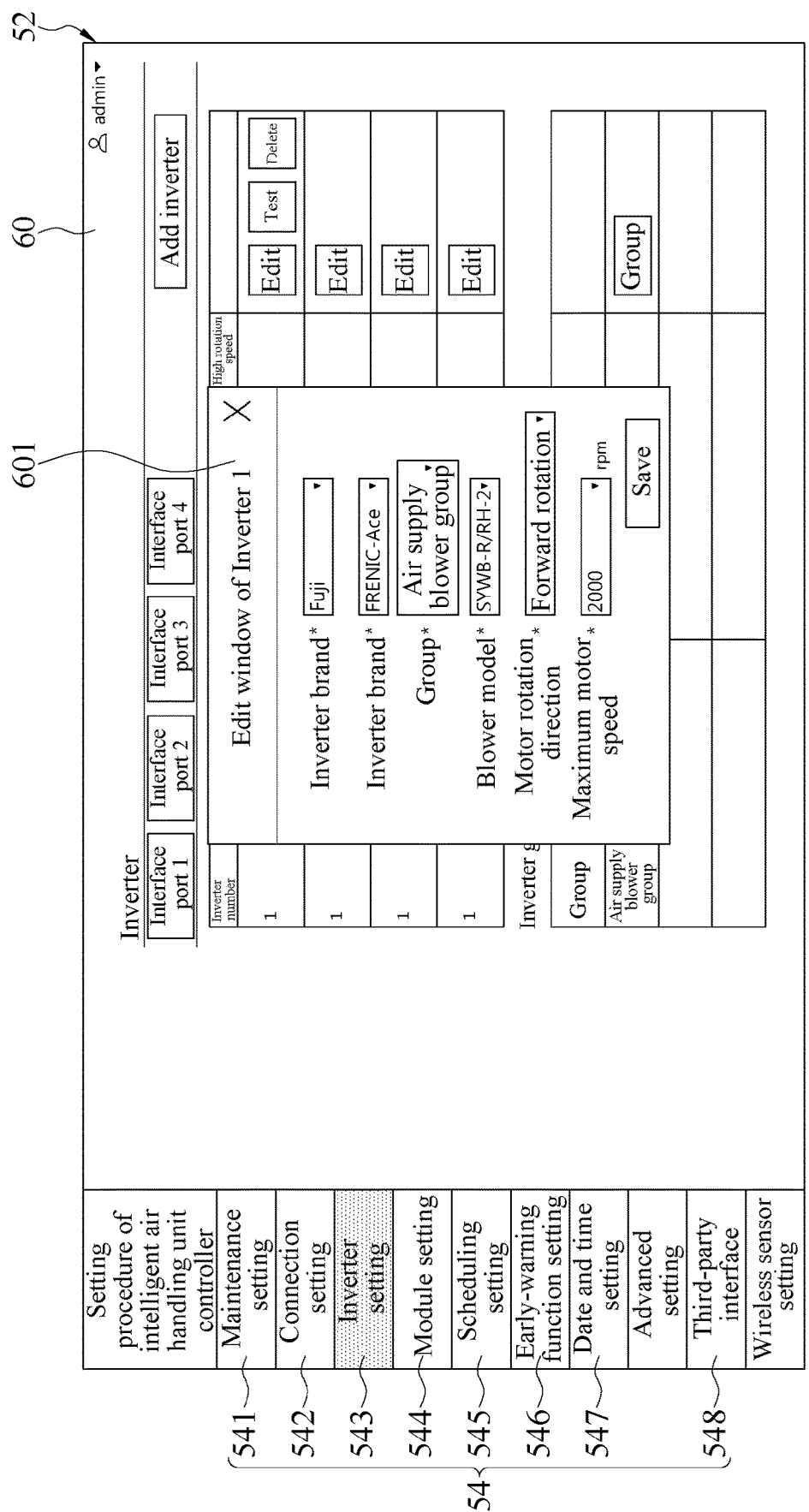
FIG. 6 is a schematic diagram of display of an edit window in an inverter setting according to an embodiment of the present disclosure.
Figure 7:
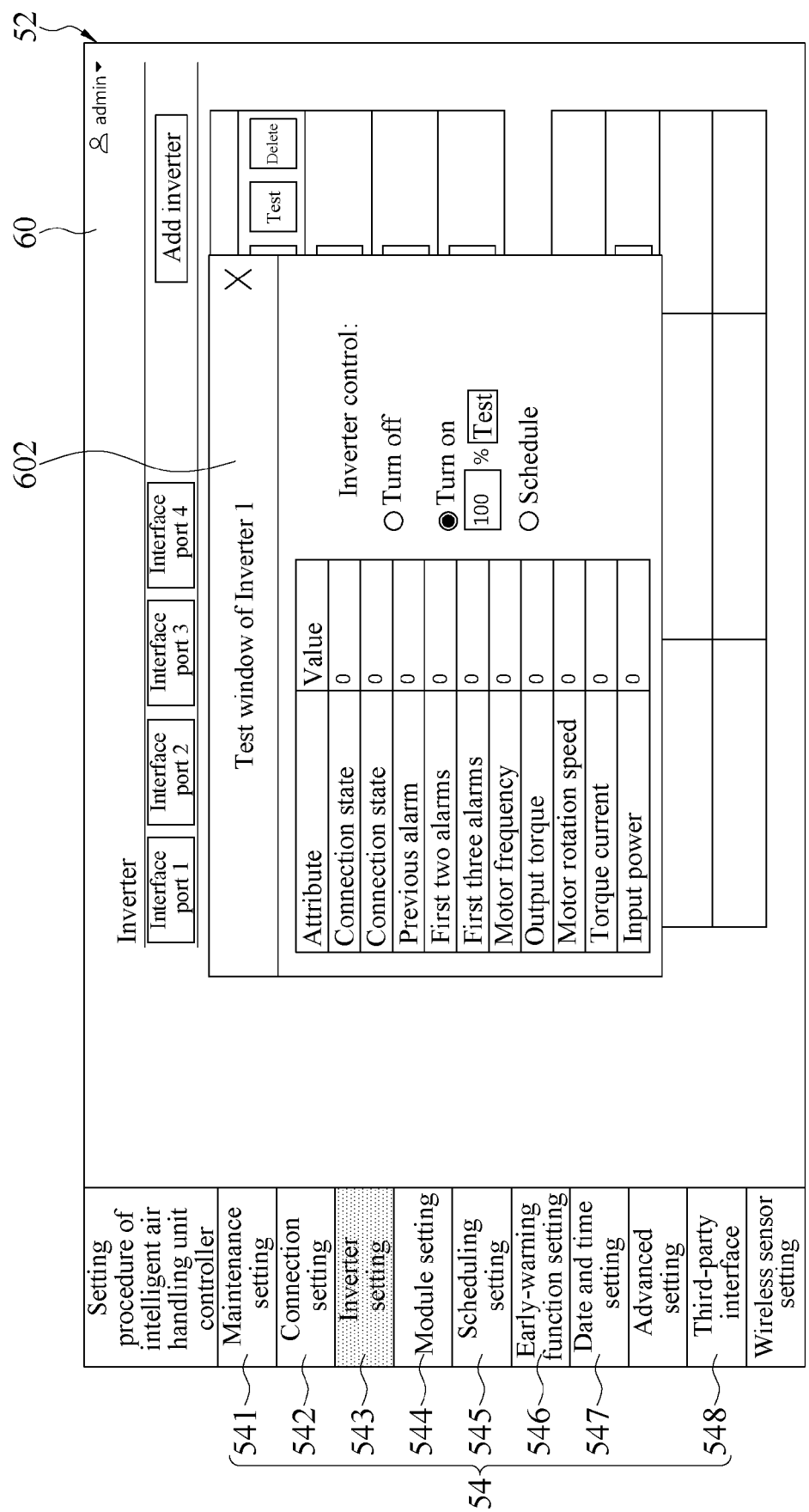
FIG. 7 is a schematic diagram of display of an test window in an inverter setting according to an embodiment of the present disclosure.
Figure 8:
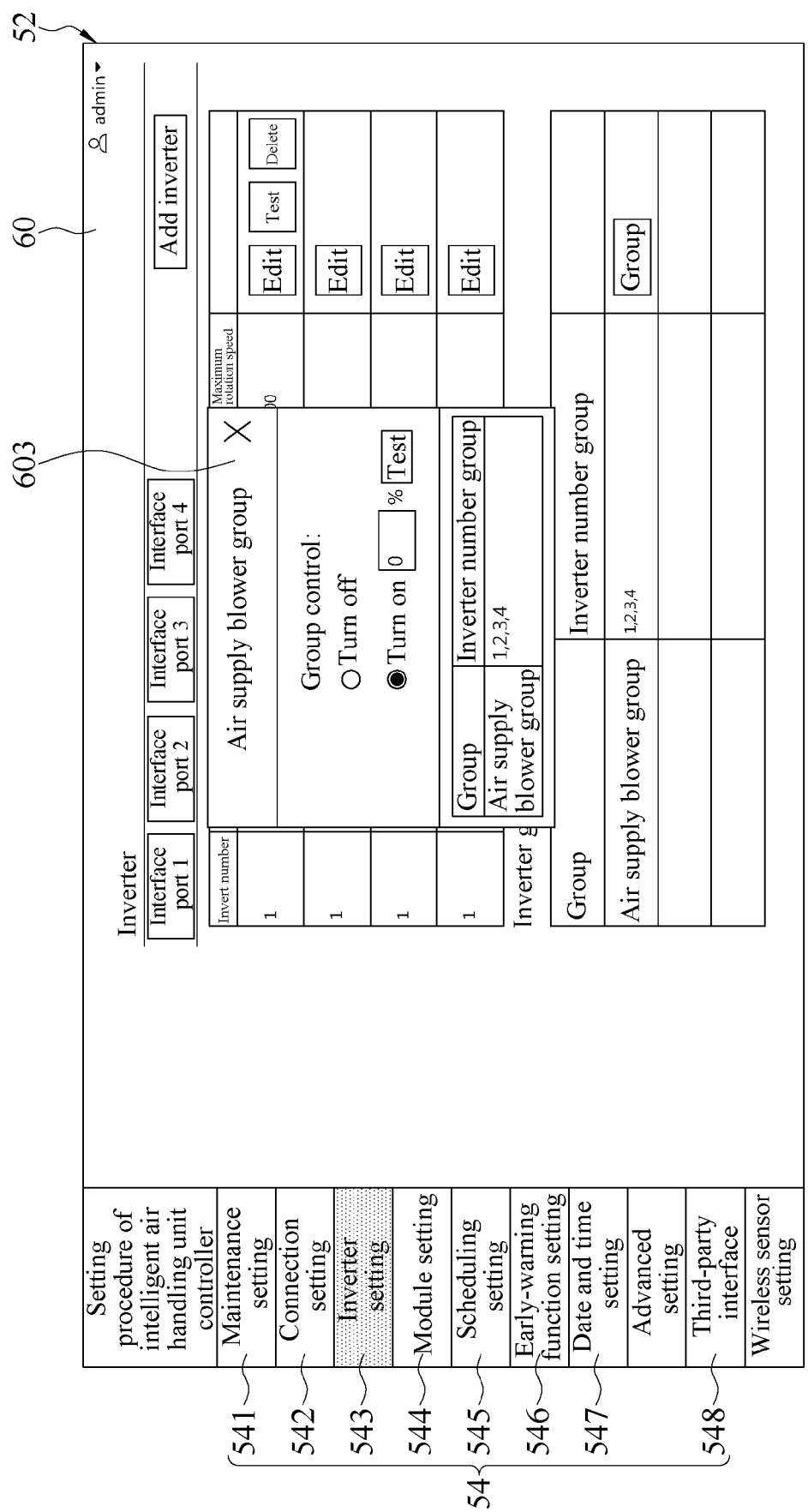
FIG. 8 is a schematic diagram of display of a group window in an inverter setting according to an embodiment of the present disclosure.

Referring to FIG. 1 and FIG. 5 together, for the inverter setting 543 in the setting items 54, when the inverter setting 543 in the setting items 54 on the setting interface 52 is clicked, the inverter setting 543 is triggered to display a corresponding setting page 60 to execute a corresponding setting procedure to set the inverter 311 of the blower 31. The setting procedure of the inverter setting 543 includes: editing and defining the inverter 311 according to different interface ports, as in an edit window 601 shown in FIG. 6, to edit parameters of each inverter 311; carrying out a connection operation control test on a single inverter 311, as in an test window 602 shown in FIG. 7, to obtain all attributes corresponding to the inverter 311 and values thereof; and carrying out a group connection operation control test on the inverter 311, as in a group window 603 shown in FIG. 8, to carry out a group control test by an inspection function.

Figure 10:
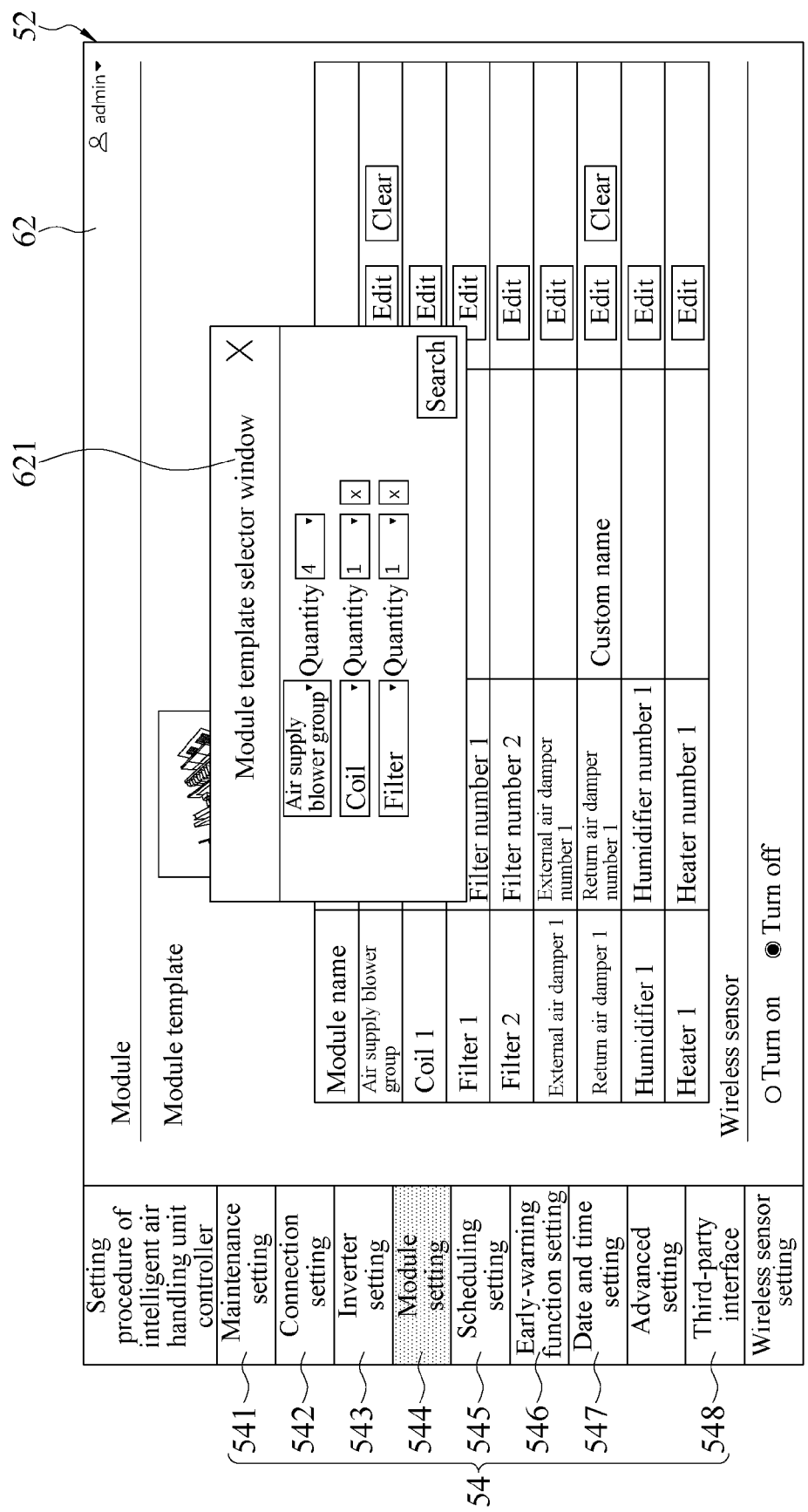
FIG. 10 is a schematic diagram of display of a select window in a module setting according to an embodiment of the present disclosure.
Figure 11:
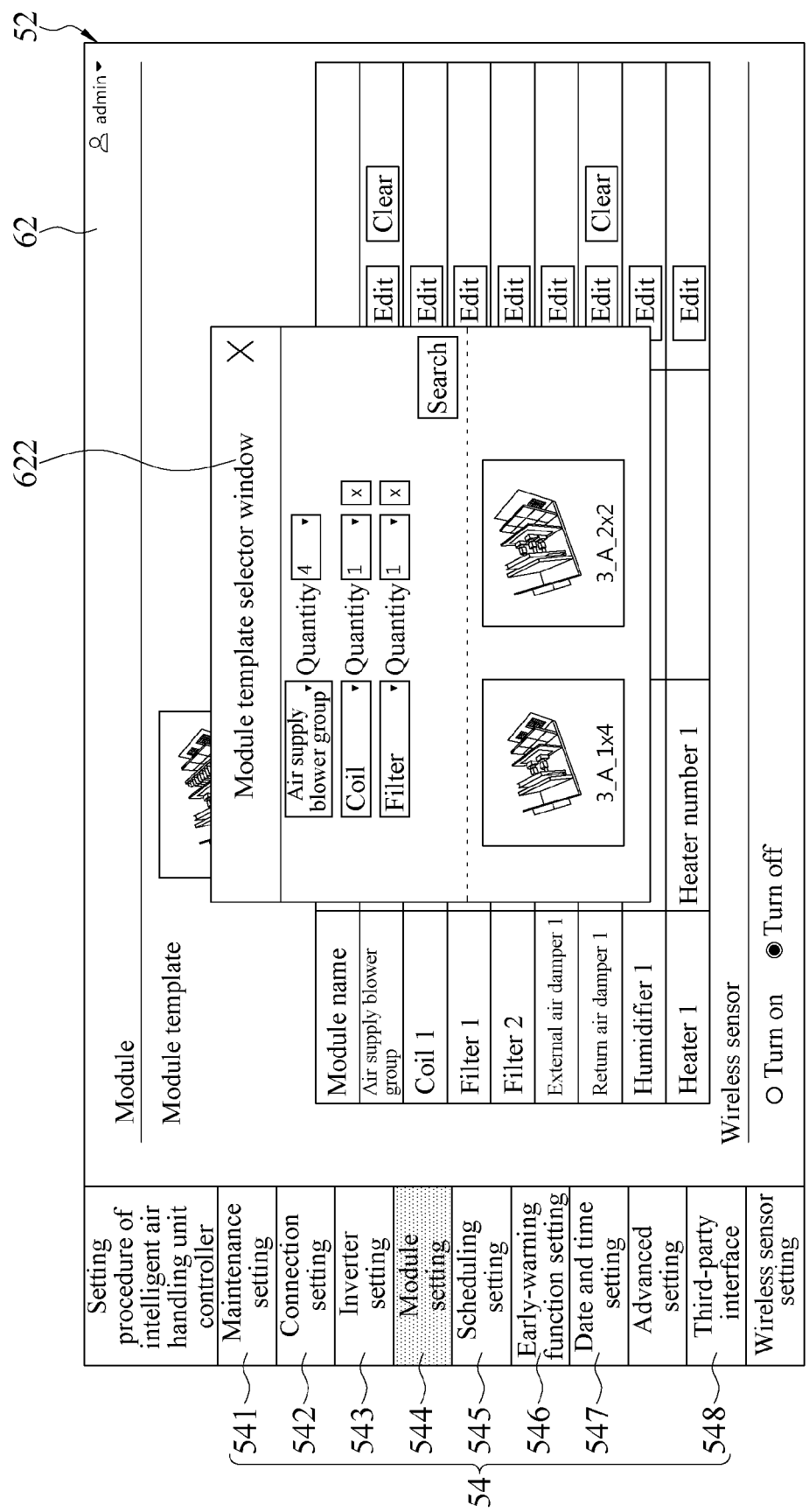
FIG. 11 is a schematic diagram of display of a select window of a module template in a module setting according to an embodiment of the present disclosure.
Figure 12:
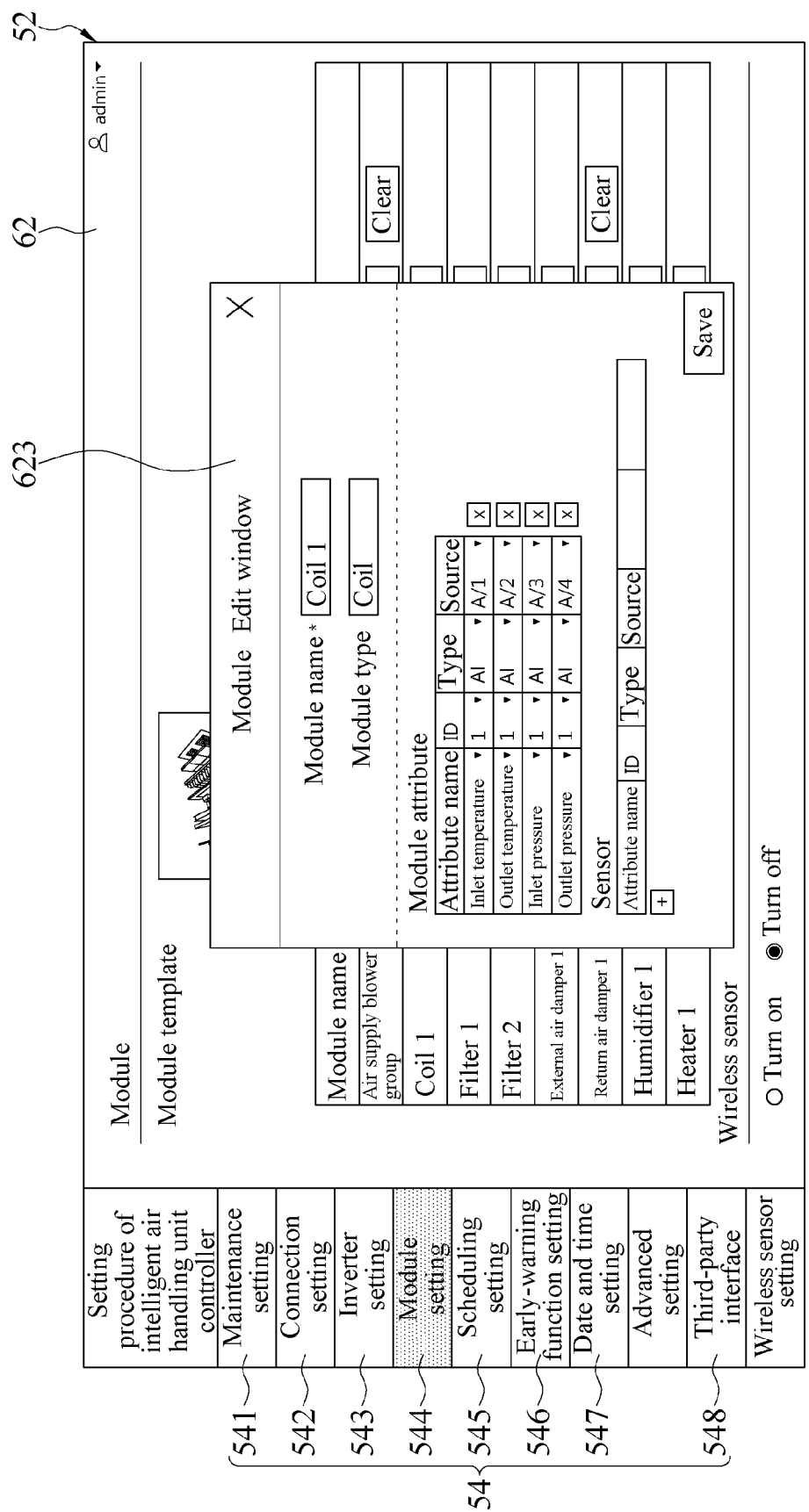
FIG. 12 is a schematic diagram of display of an edit window in a module setting according to an embodiment of the present disclosure.

Referring to FIG. 1 and FIG. 9 together, for the module setting 544 in the setting items 54, when the module setting 544 in the setting items 54 on the setting interface 52 is clicked, the module setting 544 is triggered to display a corresponding setting page 62 to execute a corresponding setting procedure. The setting procedure of the module setting 544 includes: setting an element quantity of the hardware devices 30 or the expanded hardware device 40 such as the blower 31, the coil 32, the filter 33, the damper 34, the water control valve 35, the heater 36, and the humidifier 37, as in a select window 621 shown in FIG. 10. In the step of setting the element quantity, a selection can also be made according to a plurality of module templates of the air handling unit 1 built in the main controller 11, as in a select window 622 shown in FIG. 11, to select an element quantity corresponding to one of the module templates. Then, AIO/DIO channel combinations are defined according to the sensors 20 and control elements corresponding to the hardware devices 30 and the expanded hardware device 40, as in an edit window 623 shown in FIG. 12. In an embodiment, the control elements are controllable hardware devices 30 and expanded hardware devices 40, such as the blower 31, the damper 34, the water control valve 35, the heater 36, and the humidifier 37. The AIO/DIO channel combination matched with each hardware device 30 or expanded hardware device 40 is in a preset fixed relationship. Users can add other sensors 20 as required. After parameter definitions for all the hardware devices 30 and the expanded hardware device 40 are completed, an association between the main controller 11 and the hardware devices 30 as well as the expanded hardware device 40 can be set.

Figure 14:
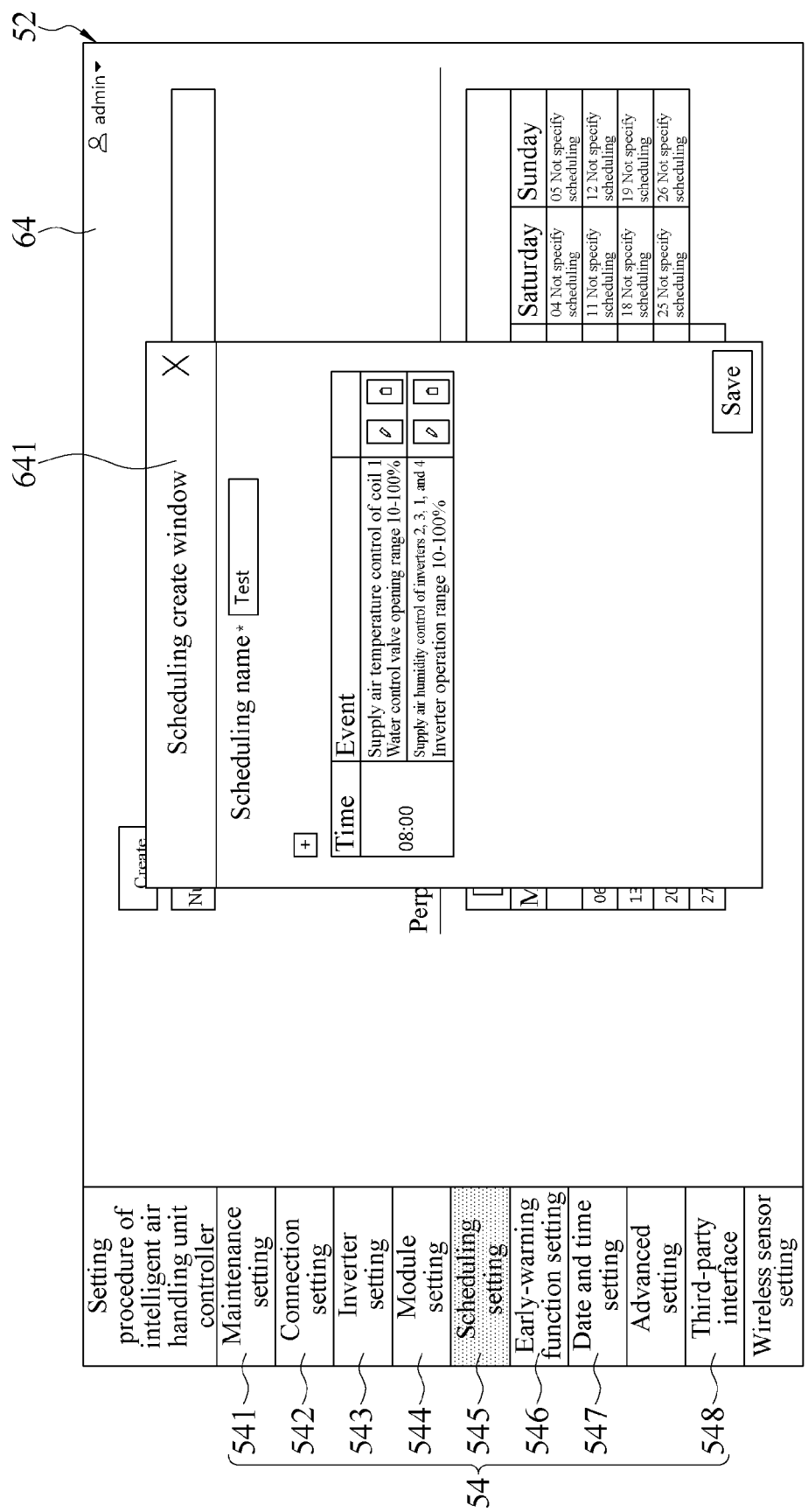
FIG. 14 is a schematic diagram of display of a create window in a scheduling setting according to an embodiment of the present disclosure.
Figure 15:
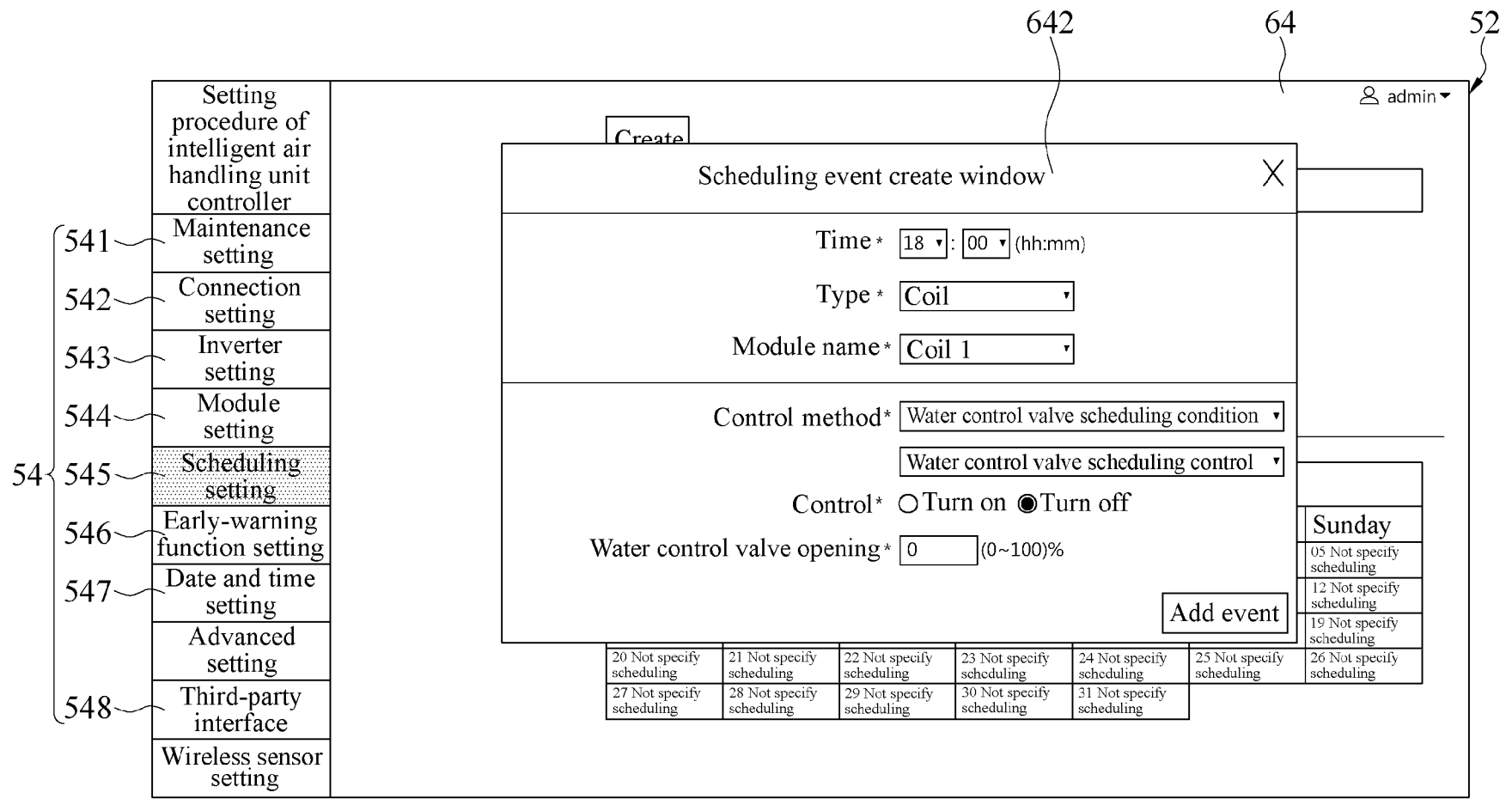
Figure 16:
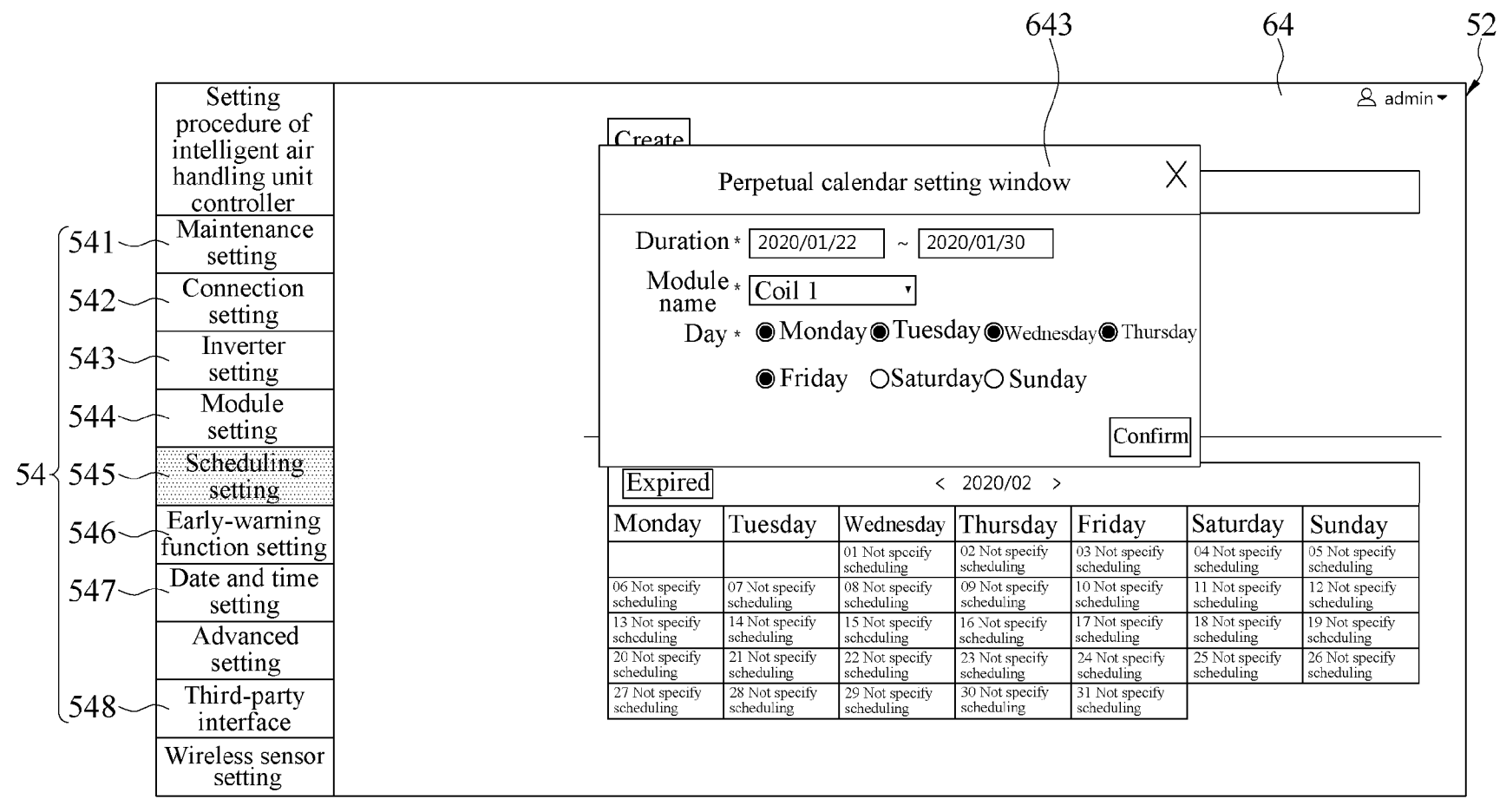

Referring to FIG. 1 and FIG. 13 together, for the scheduling setting 545 in the setting items 54, when the scheduling setting 545 in the setting items 54 on the setting interface 52 is clicked, the scheduling setting 545 is triggered to display a corresponding setting page 64 to execute a corresponding setting procedure to set scheduling events at different preset times. The setting procedure of the scheduling setting 545 includes: creating a scheduling mode by clicking create item in the setting page 64 and correspondingly generate a create window 641 as shown in FIG. 14. Scheduling control, logic selection, and definition are performed according to different time points and different hardware devices 30 or expanded hardware devices 40, as in an event create window 642 shown in FIG. 15, and after all the parameters are set, an add event option is clicked, and a new scheduling event can be added. After one or more scheduling events are established, date scheduling control corresponding to the scheduling event(s) is selected according to a perpetual calendar, as in a perpetual calendar setting window 643 shown in FIG. 16, to set duration, schedule selection, and week selection, and the entire setting is completed after saving the settings. At this point, the setting page 64 for the scheduling setting 545 is changed as shown in FIG. 17.

Figure 18:
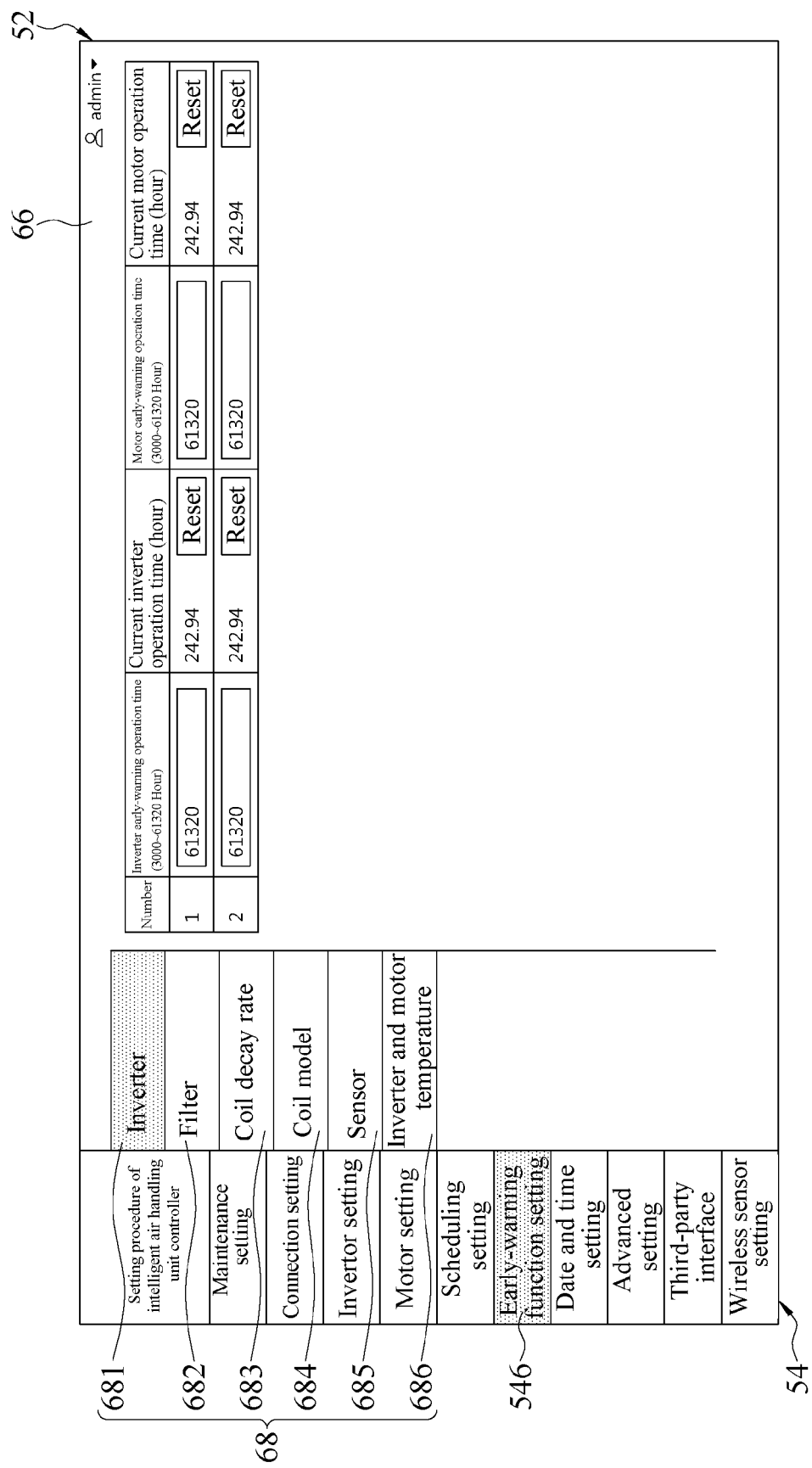
FIG. 18 is a schematic diagram of display of a setting page for an inverter of an early-warning function setting on a setting interface according to an embodiment of the present disclosure.
Figure 20:
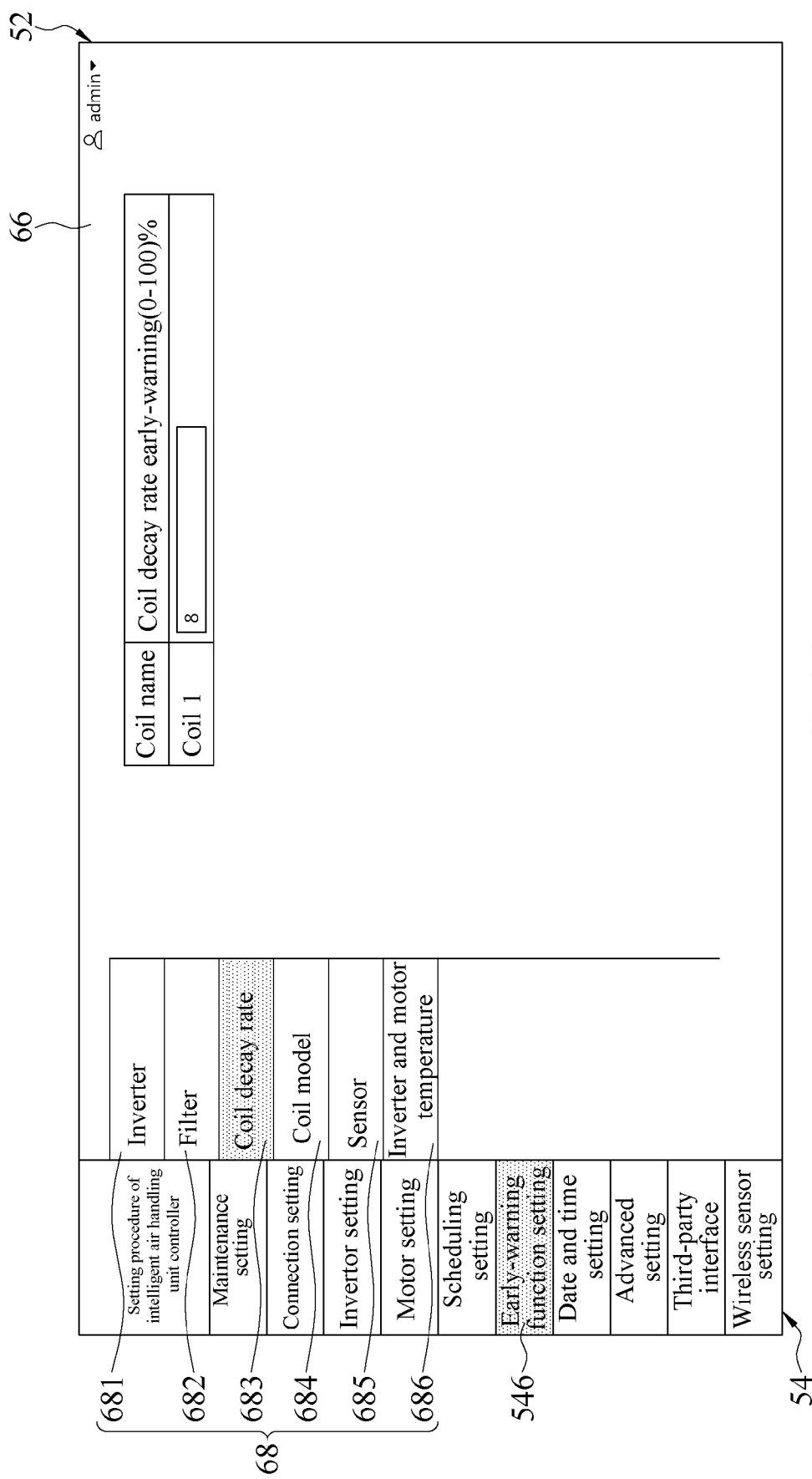
FIG. 20 is a schematic diagram of display of a setting page for a coil decay rate of an early-warning function setting on a setting interface according to an embodiment of the present disclosure.
Figure 21:
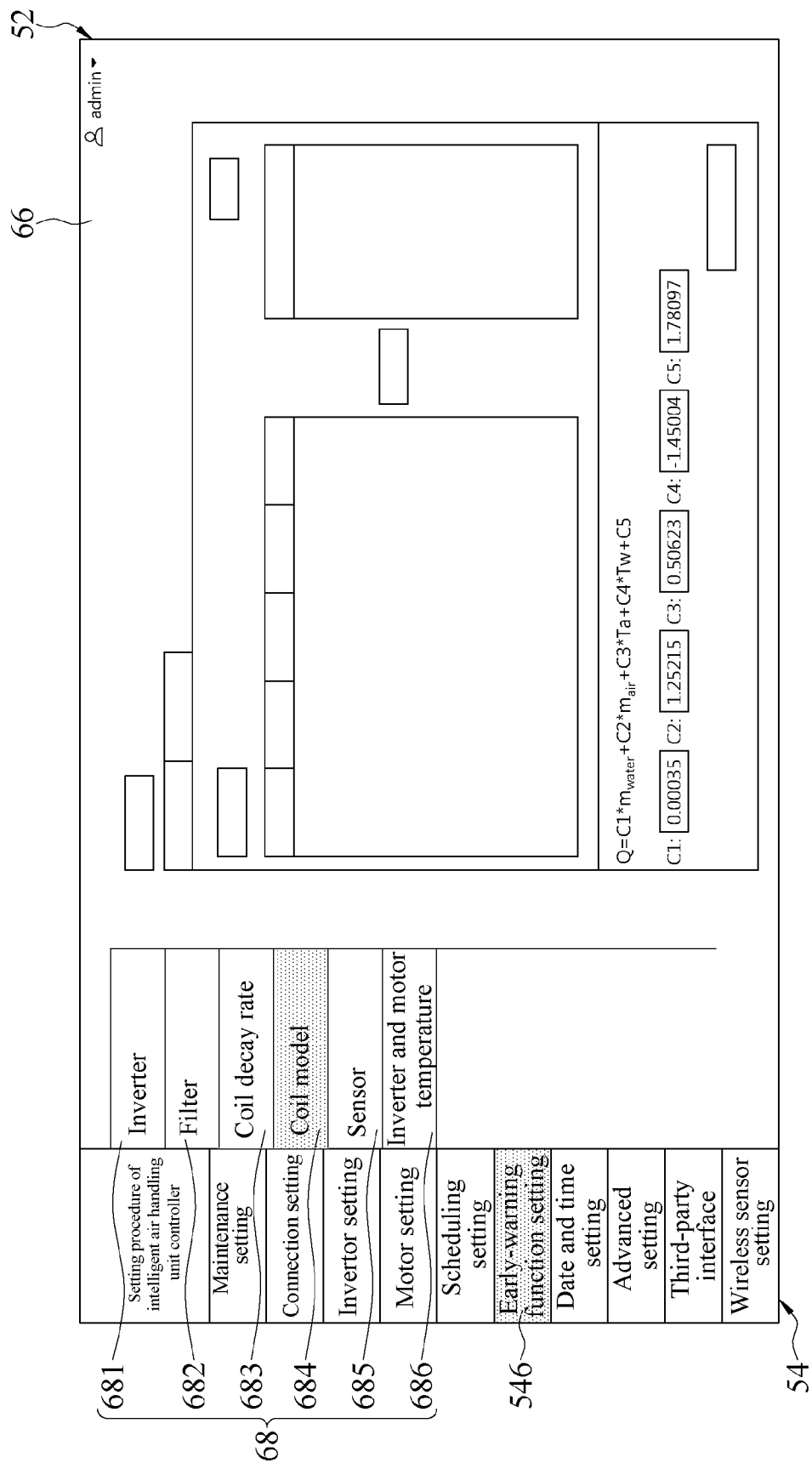
FIG. 21 is a schematic diagram of display of a setting page for a coil model of an early-warning function setting on a setting interface according to an embodiment of the present disclosure.
Figure 22:
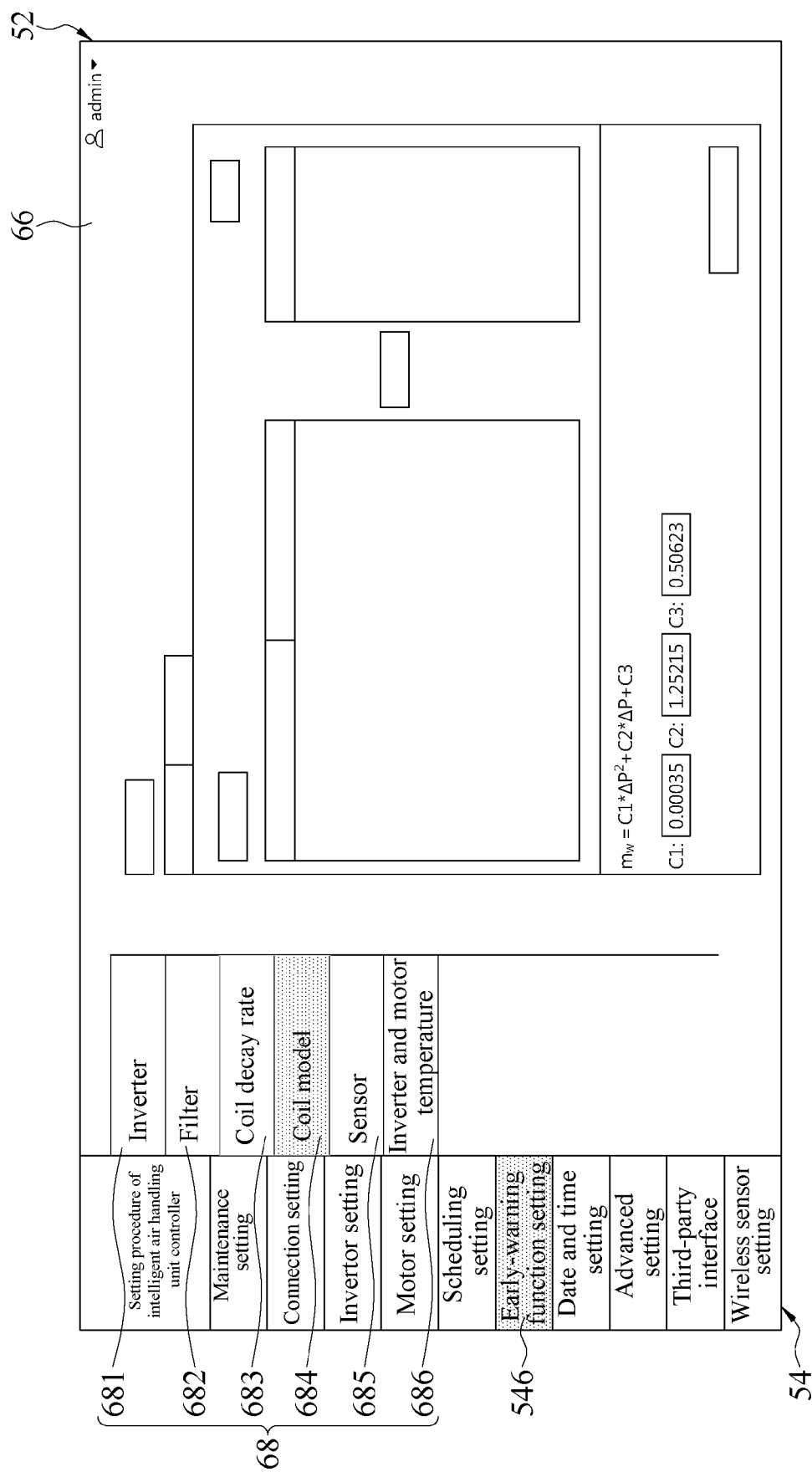
FIG. 22 is a schematic diagram of display of a setting page for a coil model of an early-warning function setting on a setting interface according to an embodiment of the present disclosure.
Figure 23:
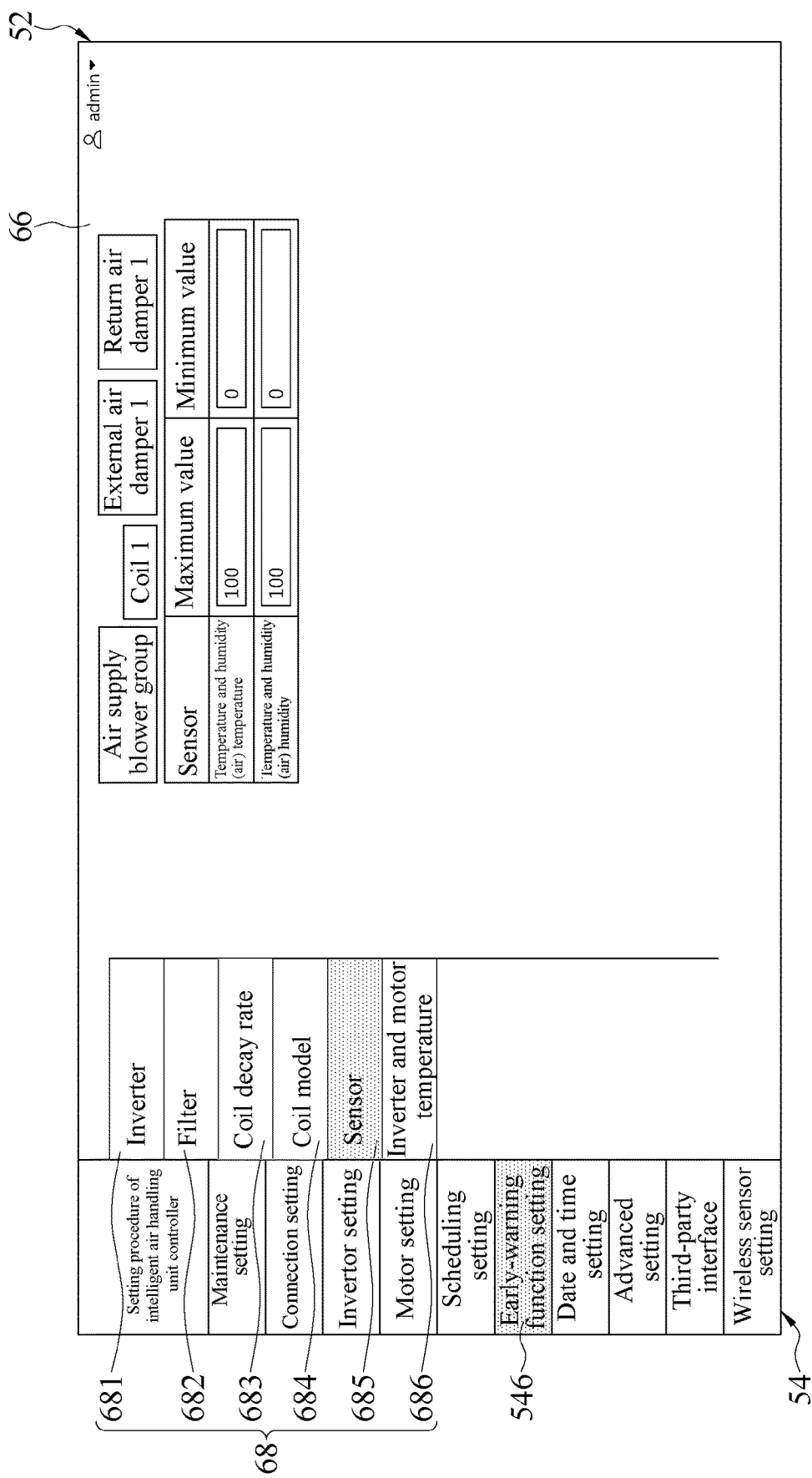
FIG. 23 is a schematic diagram of display of a setting page for a sensor of an early-warning function setting on a setting interface according to an embodiment of the present disclosure.

Referring to FIG. 1 and FIG. 18 together, for the early-warning function setting 546 in the setting items 54, when the early-warning function setting 546 in the setting items 54 on the setting interface 52 is clicked, the early-warning function setting 546 is triggered to display a corresponding setting page 66, and display a plurality of sub-items 68 in the setting page 66, including an inverter 681, a filter 682, a coil decay rate 683, a coil model 684, a sensor 685, an inverter and motor temperature 686, etc., to provide a further selection, and execute a corresponding setting procedure. The setting procedure of the early-warning function setting 546 includes: defining early-warning operation hours of the inverter 311 and the motor 312 as shown in FIG. 18 when the inverter 681 in the sub-items 68 is clicked; defining early-warning operation temperatures of the inverter 311 and the motor 312 as shown in FIG. 19 when the inverter and motor temperature 686 in the sub-items 68 is clicked; defining early-warning decay rates of the coil 32 and the blower 31 as shown in FIG. 20 when the coil decay rate 683 in the sub-items 68 is clicked; defining an equipment performance curve parameter of the coil 32 and the blower 31 to establish a coil model as shown in FIG. 21 and FIG. 22 when the coil model 684 in the sub-items 68 is clicked; defining upper and lower warning values during sensing of all the sensors 20 as shown in FIG. 23 when the sensor 685 in the sub-items 68 is clicked; and defining an initial pressure difference value and a pressure difference early-warning value of the filter 33 as shown in FIG. 24 when the filter 682 in the sub-items 68 is clicked. After the early-warning operation hours and the early-warning operation temperatures of the inverter 311 and the motor 312 are defined, the main controller 11 may send an alert when actual operation hours of the inverter 311 or the motor 312 exceed the early-warning operation hours and actual operation temperatures exceed the early-warning operation temperatures. After the equipment performance curve parameter and the early-warning decay rate of the coil 32 and the blower 31 are defined, in an embodiment, the main controller 11 may compare the equipment performance curve parameter with the equipment parameter measured by the sensors 20 to estimate an actual decay rate of the coil 32 or the blower 31, and when the actual decay rate reaches the early-warning decay rate, the main controller 11 may send an alert to complete the efficiency decay early-warning function of the coil 32 and the blower 31. After the upper and lower warning values during sensing of all the sensors 20 are defined, the main controller 11 may send an alert when actual sensed values of the sensors 20 exceed the range of the upper and lower warning values. After the initial pressure difference value and the pressure difference early-warning value of the filter 33 are defined, the main controller 11 may also send an alert when an actual pressure difference value of the filter sensed by the sensors 20 exceeds the pressure difference early-warning value. Therefore, by setting an early-warning function for the hardware devices 30 and the expanded hardware device 40, it is ensured that operational efficiency and states of the elements during the operation of the air handling unit 1 can be actively detected, and the function of equipment efficiency prediction alarm can be achieved.

Figure 25:
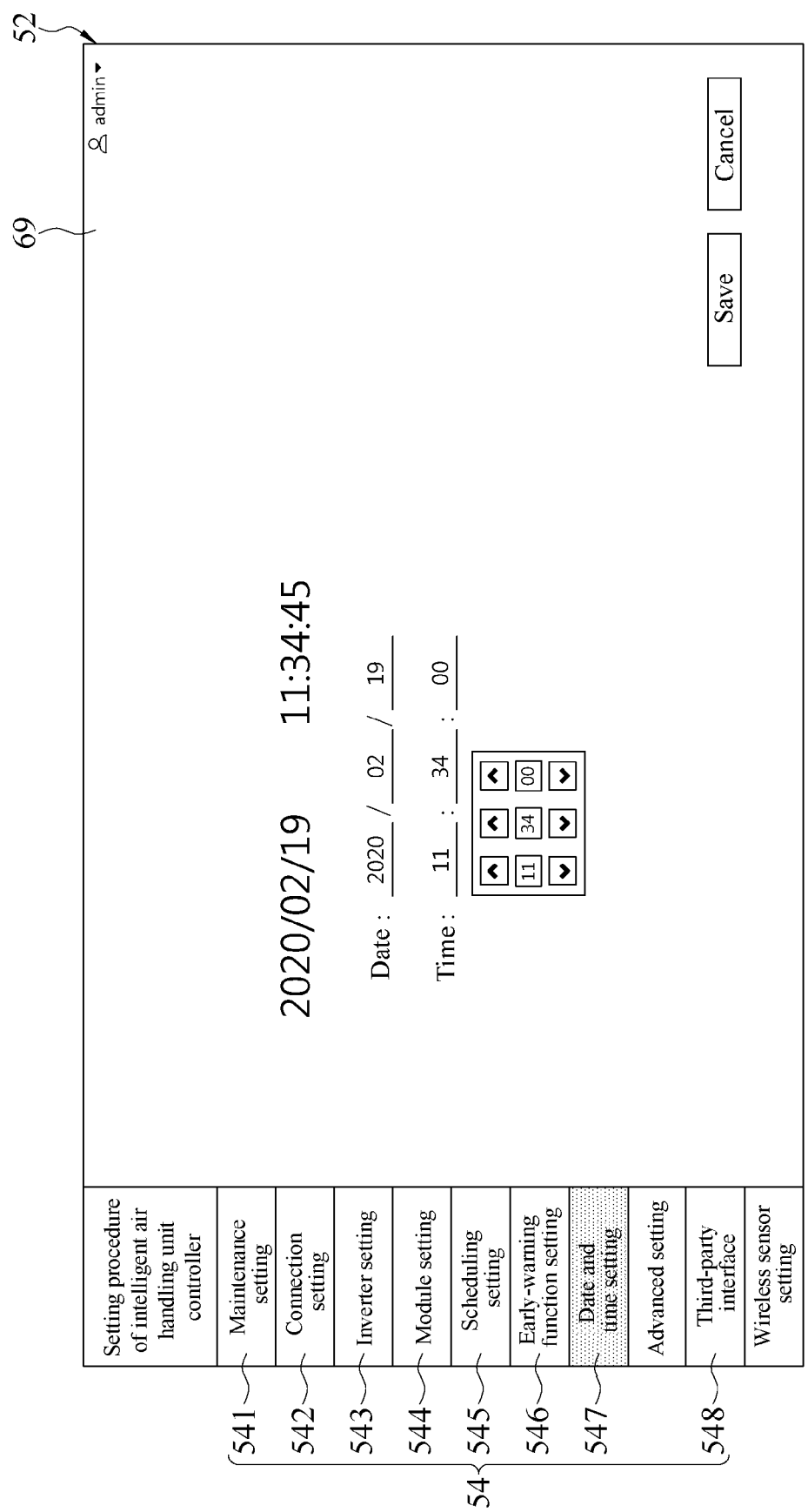
FIG. 25 is a schematic diagram of display of a setting page for a date and time setting on a setting interface according to an embodiment of the present disclosure.

Referring to FIG. 1 and FIG. 25 together, for the date and time setting 547 in the setting items 54, when the date and time setting 547 in the setting items 54 on the setting interface 52 is clicked, the date and time setting 547 is triggered to display a corresponding setting page 69 to execute a corresponding setting procedure to set equipment time, thereby setting the current date and time of the control system 10.

Referring to FIG. 1 and FIG. 26 together, for the third-party interface 548 in the setting items 54, when the third-party interface 548 in the setting items 54 on the setting interface 52 is clicked, the third-party interface 548 is triggered to display a corresponding setting page 70 to execute a corresponding setting procedure to produce communication content of a third party, thereby providing, downloading, and outputting information such as equipment, attributes, instruction functions, and instructions corresponding to each AIO/DIO channel to the third party.

The setting interface 52 disclosed herein includes a plurality of setting items 54. Without departing from the claims, in the foregoing setting process, the order of the setting items 54 and each setting procedure may not be necessarily selected based on the order in which the setting items 54 on the setting interface 52 are arranged or the order described above, and corresponding setting items 54 can be arbitrarily selected as required for setting.

Figure 27:
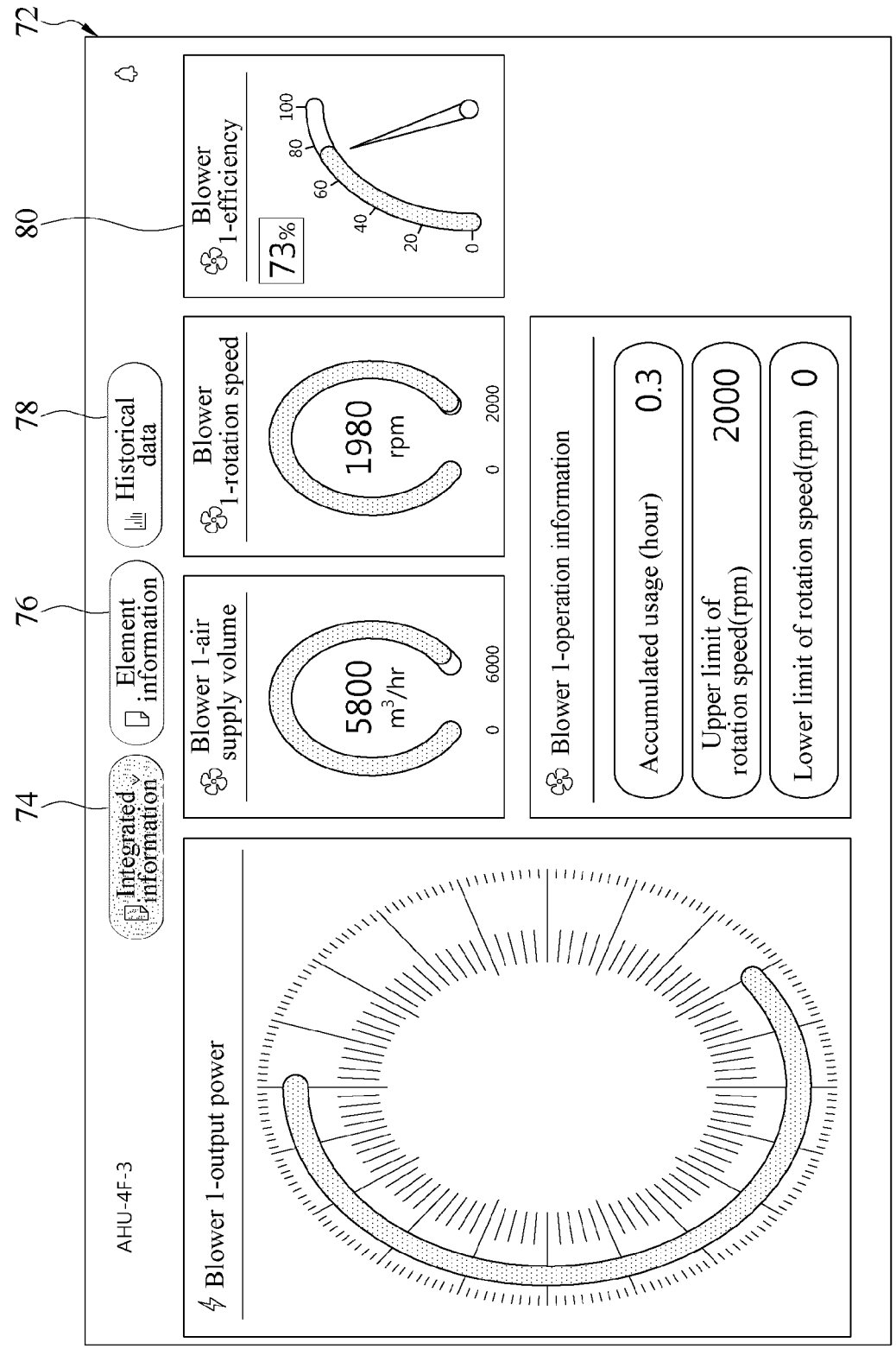
FIG. 27 is a schematic diagram of display of integrated information on a display interface according to an embodiment of the present disclosure.
Figure 28:
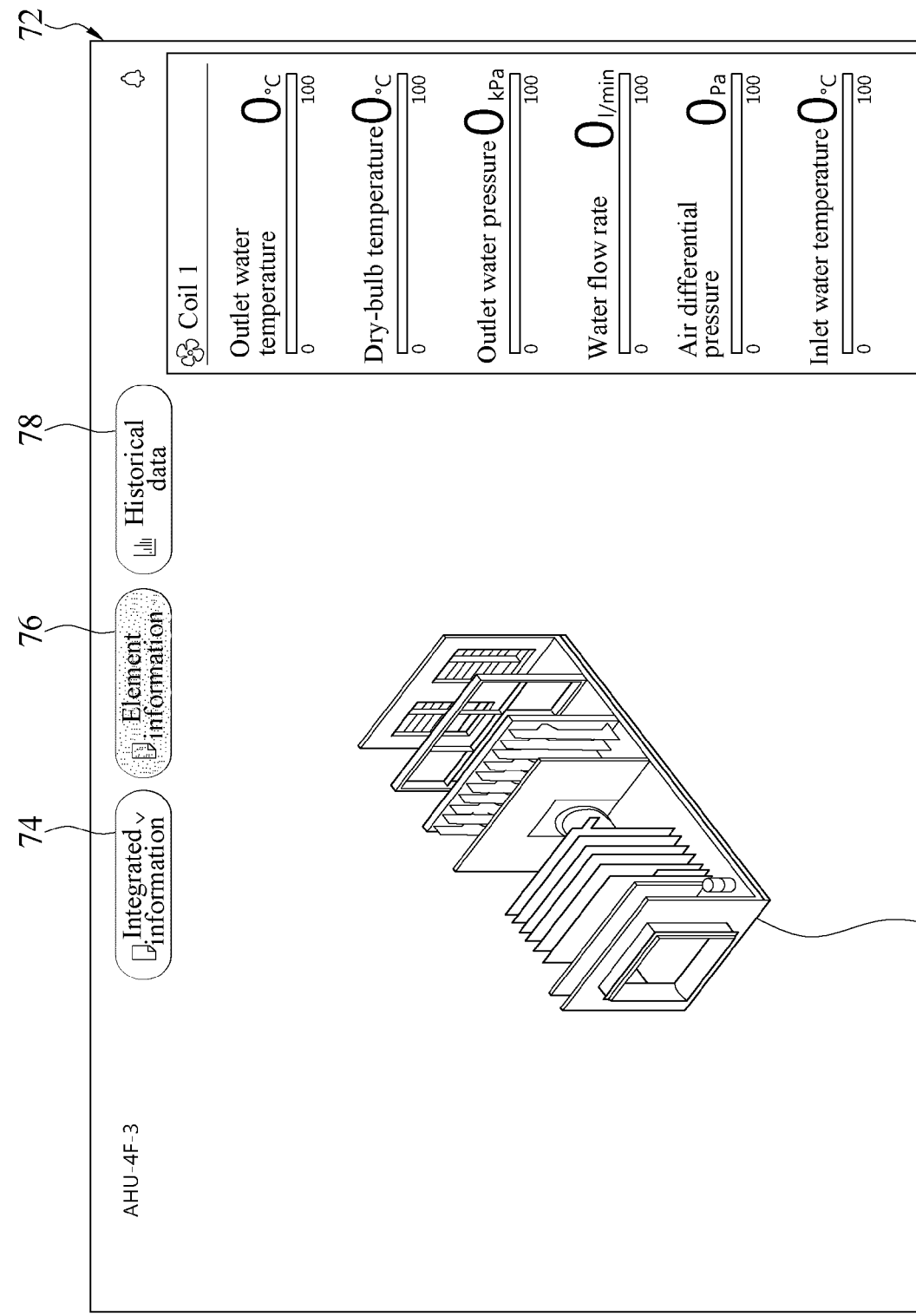
FIG. 28 is a schematic diagram of display of element information on a display interface according to an embodiment of the present disclosure.
Figure 29:
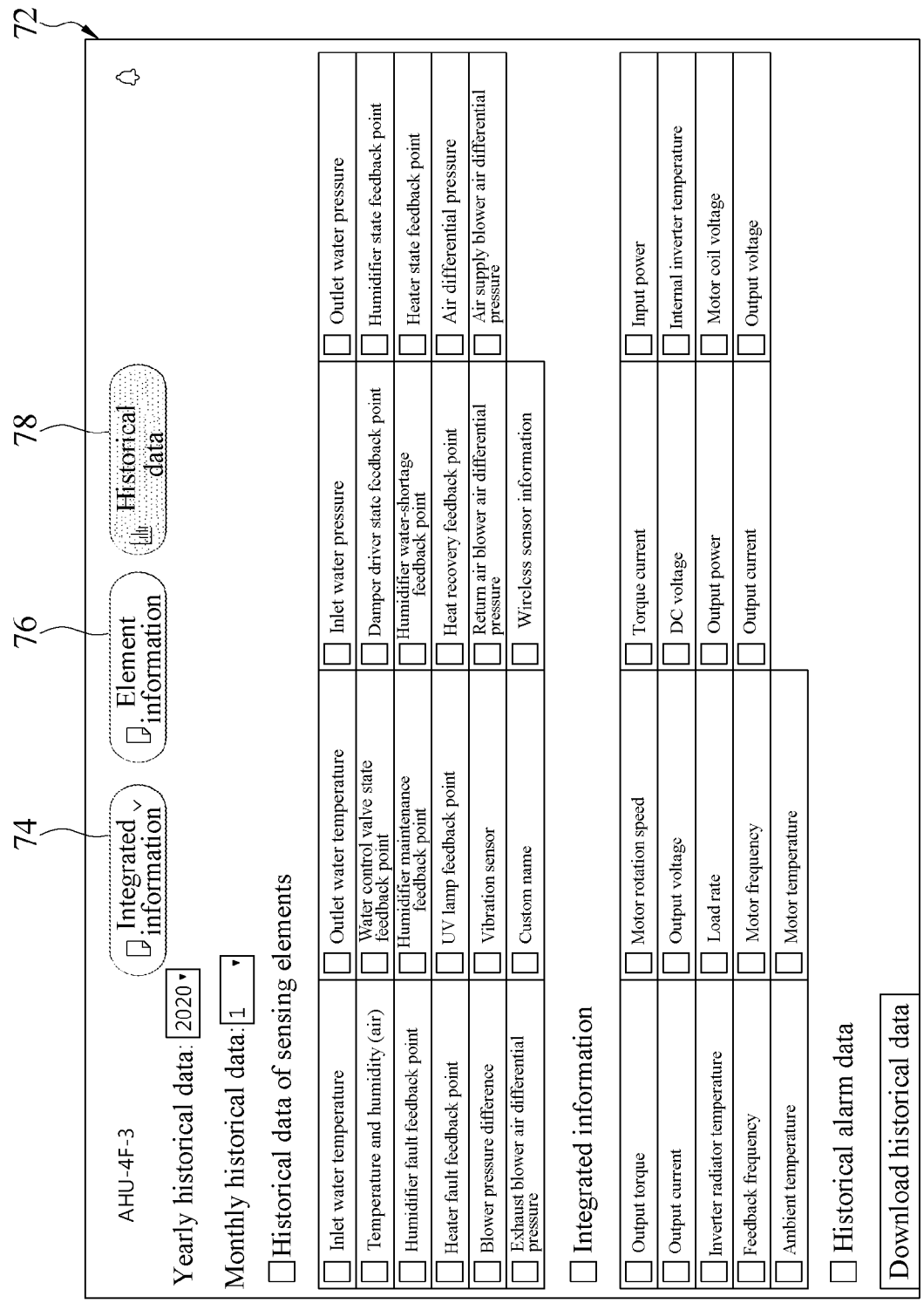
FIG. 29 is a schematic diagram of display of historical data on a display interface according to an embodiment of the present disclosure.

Referring to FIG. 1 and FIG. 27 together, after the main controller 11 has set all the hardware devices 30 and the expanded hardware device 40, the main controller 11 can further provide a display interface 72, and the display interface 72 is also displayed on the screen 50. The display interface 72 includes integrated information 74, element information 76, and historical data 78. When the users select the option of the integrated information 74, graphical integrated information 80 during operation of the hardware devices 30 and the expanded hardware device 40 may be presented on the display interface 72. Referring to FIG. 1 and FIG. 28 together, when the users select the option of the element information 76 on the display interface 72, a plurality of graphical elements 82 corresponding to the hardware devices 30 and the expanded hardware device 40 may be presented on the display interface 72, and when one of the graphical elements 82 is clicked, the equipment parameter and the ambient parameter of the hardware device 30 or the expanded hardware device 40 corresponding to the clicked graphical element 82 may be simultaneously displayed on the display interface 72. When the users select the option of the historical data 78 on the display interface 72, as shown in FIG. 29, yearly historical data, monthly historical data, historical data of sensing elements, historical data of inverters, and a variety of historical data may be displayed on the display interface 72 for the users to select, so as to find related data of a particular historical time point.

In an embodiment, the setting interface 52 and the display interface 72 provided by the main controller 11 are logged in by user accounts and passwords respectively through login pages of different web sites to select to log in to the setting interface 52 or the display interface 72.

In conclusion, according to the present disclosure, on the premise of expandable hardware devices, a complete setting interface is provided for the hardware devices to set setting items to simplify a system setting process and effectively improve a coverage rate. Moreover, according to the present disclosure, analysis data can be effectively provided and a function of equipment (coil and blower) efficiency decay prediction alarm can be achieved, to ensure that operational efficiency and states of the hardware devices during the operation of the air handling unit can be actively detected, and visual results are provided, to achieve an objective of intelligent control.

Although the present disclosure has been described in considerable detail with reference to certain preferred embodiments thereof, the disclosure is not for limiting the scope of the present disclosure. Persons having ordinary skill in the art may make various modifications and changes without departing from the scope and spirit of the present disclosure. Therefore, the scope of the appended claims should not be limited to the description of the preferred embodiments described above.

What is claimed is:

1. An air handling unit control system, applied to an air handling unit having a plurality of hardware devices, the air handling unit control system comprising:
   at least one expansion module, configured to be electrically connected to at least one expanded hardware device; and
   a main controller, electrically connected to the expansion module to control the expanded hardware device, wherein the main controller provides a setting interface according to the hardware devices and the expanded hardware device, the setting interface comprises a plurality of setting items, and when at least one of the setting items is triggered, the main controller executes a corresponding setting procedure according to the triggered setting item to set up the hardware devices and the expanded hardware device;
   wherein the hardware devices or the at least one expanded hardware device comprise/comprises a blower and a coil; the setting items comprise an early-warning function setting, the setting procedure of the early-warning function setting comprises: defining an equipment performance curve parameter and an early-warning decay rate of the coil and the blower; the main controller compares the equipment performance curve parameter with a measured equipment parameter to estimate an actual decay rate of the coil or the blower, and the main controller sends an alert when the actual decay rate reaches the early-warning decay rate.

2. The air handling unit control system according to claim 1, wherein the hardware devices or the at least one expanded hardware device further comprise/comprises a filter, a damper, a water control valve, a heater, or a humidifier, and the blower comprises an inverter and a motor.

3. The air handling unit control system according to claim 2, wherein the main controller is further signally connected to a plurality of sensors, configured to sense the equipment parameter and an ambient parameter during operation of the hardware devices and the at least one expanded hardware device, respectively, and return the equipment parameter and the ambient parameter to the main controller.

4. The air handling unit control system according to claim 3, wherein the setting items further comprise a maintenance setting, a connection setting, an inverter setting, a module setting, a scheduling setting, and a date and time setting.

5. The air handling unit control system according to claim 4, wherein the setting items further comprise a third-party interface.

6. The air handling unit control system according to claim 4, wherein the inverter setting is used for setting the inverter of the blower, and the setting procedure of the inverter setting comprises: editing and defining the inverter according to different interface ports; and carrying out a connection operation control test on a single inverter.

7. The air handling unit control system according to claim 6, wherein the inverter setting further comprises carrying out a group connection operation control test on the inverter.

8. The air handling unit control system according to claim 4, wherein the setting procedure of the module setting comprises: setting an element quantity of the blower, the coil, the filter, the damper, the water control valve, the heater, and the humidifier sequentially; and defining AIO/DIO channel combinations according to the sensors and control elements corresponding to the hardware devices and the at least one expanded hardware device to complete an association setting for the main controller and the hardware devices as well as the at least one expanded hardware device.

9. The air handling unit control system according to claim 8, wherein the setting of the element quantity is further selected according to a plurality of module templates built in the main controller.

10. The air handling unit control system according to claim 4, wherein the setting procedure of the scheduling setting comprises: creating a scheduling mode; performing scheduling control, logic selection, and definition according to different time points and the different hardware devices and the at least one expanded hardware device to add a scheduling event; and selecting date scheduling control corresponding to the scheduling event according to a perpetual calendar.

11. The air handling unit control system according to claim 4, wherein the setting procedure of the early-warning function setting further comprises: defining early-warning operation hours and early-warning operating temperatures of the inverter and the motor; defining upper and lower warning values during sensing of the sensors; and defining an initial pressure difference value and a pressure difference early-warning value.

12. The air handling unit control system according to claim 1, wherein the at least one expansion module is electrically connected to the main controller through a connection line.

13. The air handling unit control system according to claim 1, wherein the main controller is further electrically connected to a screen, configured to display the setting interface.

14. The air handling unit control system according to claim 3, wherein after the main controller completes the settings of the hardware devices and the at least one expanded hardware device, the main controller further provides a display interface to present a plurality of graphical elements corresponding to the hardware devices and the at least one expanded hardware device on the display interface, and when one of the graphical elements is clicked, the equipment parameter and the ambient parameter corresponding to the clicked graphical element are simultaneously displayed on the display interface.

15. The air handling unit control system according to claim 3, wherein after the main controller completes the settings of the hardware devices and the at least one expanded hardware device, the main controller further provides a display interface to present graphical integrated information corresponding to the hardware devices and the at least one expanded hardware device on the display interface during operation.

* * * * *